US011022696B1

(12) United States Patent
Kacem et al.

(10) Patent No.: US 11,022,696 B1
(45) Date of Patent: Jun. 1, 2021

(54) ADS-BSEC: A HOLISTIC FRAMEWORK TO SECURE ADS-B

(71) Applicant: George Mason University, Fairfax, VA (US)

(72) Inventors: Thabet Kacem, Arlington, VA (US); Duminda Wijesekera, Fairfax, VA (US); Paulo Cesar Guerreiro da Costa, Woodbridge, VA (US); Alexandre de Barros Barreto, Sao Jose dos Campos/SP (BR)

(73) Assignee: George Mason University, Fairfax, VA (US)

( * ) Notice: Subject to any disclaimer, the term of this patent is extended or adjusted under 35 U.S.C. 154(b) by 329 days.

(21) Appl. No.: 16/161,881

(22) Filed: Oct. 16, 2018

Related U.S. Application Data

(60) Provisional application No. 62/573,714, filed on Oct. 18, 2017.

(51) Int. Cl.
*G01S 19/21* (2010.01)
*H04L 9/32* (2006.01)
(Continued)

(52) U.S. Cl.
CPC ............ *G01S 19/215* (2013.01); *G01S 19/03* (2013.01); *G06F 11/1004* (2013.01); *G06N 5/04* (2013.01); *H04L 9/3242* (2013.01)

(58) Field of Classification Search
CPC .... G01S 19/215; G01S 19/03; G06F 11/1004; G06N 5/04; H04L 9/3242
(Continued)

(56) References Cited

U.S. PATENT DOCUMENTS

| 6,892,317 | B1 * | 5/2005 | Sampath | G06F 11/25 714/4.3 |
| 8,209,542 | B2 * | 6/2012 | Kumar | G06F 21/57 713/187 |

(Continued)

FOREIGN PATENT DOCUMENTS

| EP | 2511730 A1 * | 10/2012 | H04H 40/27 |
| GB | 2514227 A * | 11/2014 | H04B 7/18506 |

(Continued)

OTHER PUBLICATIONS

A. Costin abd A. Francillon, Ghost in the Air(Traffic): On insecurity of ADS-B protocol and practical attacks on ADS-B devices, EUROCON, 2012.

(Continued)

*Primary Examiner* — Bernarr E Gregory
*Assistant Examiner* — Nuzhat Pervin
(74) *Attorney, Agent, or Firm* — Carter, DeLuca & Farrell LLP; George Likourezos

(57) ABSTRACT

Automatic Dependent Surveillance Broadcast (ADS-B) is one of the most prominent air traffic surveillance technologies. It can be used not only as a complement in existing radar-based technologies to locate aircraft, but also as a replacement in areas without radar coverage. However, a major flaw in the deployment of this technology is it reliance on clear-text, open broadcast of messages, which makes it vulnerable to attackers. A solution to this vulnerability is ADS-Bsec, a holistic framework that solves the root cause of ADS-B problems by enforcing authenticity and integrity in ADS-B messages. This is accomplished without changing the message format and, along with a proper key exchange mechanism. The framework also leverages results from radio-location add risk-adaptive techniques in order to prevent attacks targeting ADS-B. ADS-Bsec is a promising (Continued)

framework for integrating ADS-B to NextGen infrastructure in a secure and affordable fashion.

20 Claims, 14 Drawing Sheets

(51) Int. Cl.
  *G01S 19/03* (2010.01)
  *G06N 5/04* (2006.01)
  *G06F 11/10* (2006.01)
(58) Field of Classification Search
  USPC .......................................................... 342/16
  See application file for complete search history.

(56) References Cited

U.S. PATENT DOCUMENTS

| | | | | |
|---|---|---|---|---|
| 2002/0156849 | A1* | 10/2002 | Donoho | H04L 63/0428 709/205 |
| 2004/0086121 | A1* | 5/2004 | Viggiano | G08G 5/0008 380/255 |
| 2007/0174453 | A1* | 7/2007 | Donoho | H04L 12/1859 709/224 |
| 2007/0239986 | A1* | 10/2007 | Viggiano | H04L 9/3242 713/168 |
| 2010/0332992 | A1* | 12/2010 | Donoho | G06F 16/958 715/736 |
| 2011/0057830 | A1* | 3/2011 | Sampigethaya | G01S 5/0289 342/36 |
| 2011/0225417 | A1* | 9/2011 | Maharajh | H04L 65/4076 713/150 |
| 2014/0327564 | A1* | 11/2014 | Sampigethaya | G08G 5/0013 342/32 |
| 2015/0170524 | A1* | 6/2015 | Stefani | G05D 1/0027 701/120 |
| 2016/0011318 | A1* | 1/2016 | Cohen | G01S 19/45 342/357.26 |
| 2017/0294059 | A1* | 10/2017 | Noyelle | H04L 67/26 |
| 2019/0101650 | A1* | 4/2019 | McKeown | G01S 19/14 |
| 2019/0280870 | A1* | 9/2019 | Subramanian | H04L 9/3239 |

FOREIGN PATENT DOCUMENTS

| | | | | |
|---|---|---|---|---|
| WO | WO-2011041916 | A1 * | 4/2011 | ............ H04W 12/02 |
| WO | WO-2015130950 | A2 * | 9/2015 | ............. G01S 19/11 |

OTHER PUBLICATIONS

T. Kacem, D. Wijeskera, and P. Costa, "Integrity and authenticity of ADS-B broadcasts", IEEE Aerospace Conference (AeroConf). Big Sky, MT, USA, Mar. 2015.

T. Kacem, D. Wijesekera, P. Costa, J. Carvallio, M. Monteiro, and A. Barreto, "Key distribution mechanism in secure ADS-B networks", Integrated Communication, Navigation and Surveillance Conference (ICNS). Hemdon, VA, Apr. 2015.

T. Kacem, D. Wijesekera, P. Costa, J. Carvallio, M. Monteiro, and A. Barreto, "Secure ADS-B Design & Evaluation", IEEE International Conference on Vehicular Electronics and Safety (ICVES). Nov. 2015, Yokohama, Japan.

T. Kacem, D. Wijesekera, P. Costa, J. Carvallio, M. Monteiro, and A. Barreto, "Risk-adaptive Engine for Secure ADS-B Broadcasts", SAE AeroTech, Sep. 2015, Seattle, WA.

T. Kacem, D. Wijesekera, P. Costa, J. Carvallio, and A. Barreto, "Secure ADS-B Framework 'ADS-Bsec'", IEEE Intelligent Transportation Systems (ITSC), pp. 2681-2686, Nov. 2016, Rio di Janeiro.

T. Kacem, D. Wijesekera, P. Costa, J. Carvallio, and A. Barreto, "An ADS-B Intrusion Detection System", The 15th IEEE International Conference on Trust, Security and Privcy in Computing and Communications (IEEE TrustCom-16), pp. 544-551, Aug. 2016, Tianjin, China.

* cited by examiner

ADS-BSEC: A HOLISTIC FRAMEWORK TO SECURE ADS-B

CROSS-REFERENCE TO RELATED APPLICATION

This patent application is a conversion to a utility patent application from provisional patent application Ser. No. 62/573,714 filed Oct. 18, 2017, by Thabel Kacem, Duminada Wijesekera, Paulo Cesar Guerreiro Da Costa, and Alexandre De Barros Barreto, for "ADS-Bsec-Safety and Security in ADS-B Communications", the disclosure of which is incorporated herein by reference.

DESCRIPTION

Background of the Invention

Field of the Invention

The present invention generally relates to the Automatic Dependent Surveillance-Broadcast (ADS-B) protocol used in Air Traffic Control (ATC) and, more particularly, to a secure ADS-B framework that substantially enhances the original safety and security solutions of the protocol.

Background Description

ADS-B is a promising technology that can operate in conjunction with or as a replacement for both Primary Surveillance Radars (PSR) and Secondary Surveillance Radar (SSR). Its key advantages can be summarized as follows. First, it has much better accuracy than SSR and PSR because it uses GPS positions obtained from nearby satellites. Second, it is much easier and cost-effective to deploy and maintain ADS-B stations compared to traditional radar-based stations. As a result, ADS-B has been already use in several areas around the world such as Europe, Canada and Australia. In the US, ADS-B is the key component of the NextGen project (see Bradford, Steve, "NextGen progress and ICAO", *Proceedings of the Integrated Communications, Navigation and Surveillance Conference* (ICNS), 2014 IEEE, 2014, pp. 1-22) but deployment is still underway and is supposed to be achieved by 2020 as per federal mandate.

Despite this widespread use and the attractive features of ADS-B, several research efforts (e.g., A. Costin and A. Francillon, "Ghost in the Air(Traffic): On insecurity of ADS-B protocol and practical attacks on ADS-B devices," 2012, D. McCallie, J. Butts, and R. Mills, "Security analysis of the ADS-B implementation in the next generation air transportation system", *International Journal of Critical Infrastructure Protection*, vol. 4, no. 2, pp. 78-87, August 2011) criticized its vulnerability to a plethora of attacks, ranging from eavesdropping to more advanced variations of injection attacks. Most studies focused on using simulated environments to demonstrate the possibility of launching attacks targeting ADS-B. Very few (e.g., W. J. Pan, Z. L. Feng, and Y. Wang, "ADS-B Data Authentication Based on ECC and X.509 Certificate," *Journal of Electronic Science and Technology*, vol. 10, pp. 51-55, March 2012, Viggiano, Marc, Edward Valovage, and Marcello Distasio. "Secure automatic dependent surveillance." U.S. patent application Ser. No. 10/285,070) attempted to address the vulnerability or mitigating the attacks (e.g., preventing their impact from affecting air traffic operations). Yet, the presented solutions remain inadequate due to incompatibility with the current message format, or requiring extra messages to convey certificate-based data and would cause scalability issues.

Viggiano et al. proposed in a patent entitled "Secure Automatic Dependent Surveillance" a HMAC-based method that ensures integrity and authenticity of ADS-B messages. However, the authors mention that the final HMAC data would be included using the free bits of ADS-B in its two variations, i.e., 1090 Extended Squitter (ES) and Universal Access Transceiver (UAT) without providing further details. Unfortunately, 1090 ES does not have free bits to support this approach. They also propose to truncate the HMAC or use a subset of its bits if it is too large. Both suggestions would increase the risk of collisions to unacceptable levels. In contrast, our approach relies on fitting HMAC-based metadata within the ADS-B message without changing its format. More specifically, we use HMAC metadata in place of the Cyclic Redundancy Check (CRC) at software level, without the need for new hardware.

In practice, ADS-B data is encapsulated in Modes S Extended Squitter (1090 ES) frames. A "squit" is a transmission format that routinely sends aircraft ID and positional information without being interrogated. The Mode S squitter works to minimize transmitted "chatter" in the system by reducing the need for back-and-forth interrogation/response over the air. The structure of the frame is as follows. First, the preamble is used for synchronization, while DF Format and capability fields indicate, respectively, the type of protocol being used and the corresponding sub-protocol. The ICAO field uniquely identifies every aircraft, and the CRC field is used for bit error verification and correction. The remaining 56-bit ADS-B data provides longitude, latitude, altitude, velocity and/or bearing. Under the ADS-B protocol, each aircraft's GPS navigation system generates some 49 individual parameters which can be sent over the extended squinter. This data is transmitted once per second allowing ground controllers and other aircraft in the vicinity to track each airplane's flight path with great precision and accuracy.

Pan et al. proposed a solution to secure ADS-B running on UAT by introducing a public key infrastructure (PKI) scheme that uses Elliptical Curve Cipher (ECC) and X.509 certificates. This solution would require five extra messages for every transmission to accommodate the signature data, making it unfeasible.

Costin and Francillon explored the possibility of launching message injection attacks in a simulated environment. The authors did not elaborate on possible implementations and only suggested the use of PKI schemes.

Strohmeier et al. (see M. Strohmeier, Martin, V. Lenders, and I. Martinovic, "Lightweight location verification in air traffic surveillance networks", *Proceedings of the 1st ACM Workshop on Cyber-Physical System Security*, pages 49-60, April 2015) proposed a solution that relies on location verification mechanisms by measuring the Time Difference of Arrival (TDOA) of ADS-B messages from nearby aircraft, which are then compared with the estimated aircraft position according to the flight path. The authors rely on location verification alone, as they deem impossible to use cryptographic methods. Thus, their approach fails to perform method attribution, which in ADS-Bsec is achieved by combining cryptographic and radio-location mechanisms.

Multilateration (see Herrero, J. Garcia, et al. "ASDE and multilateration mode-S data fusion for location and identification on airport surface", Radar Conference, 1999, The Record of the 1999 IEEE. IEEE, 1999) is a passive surveillance technique used to locate malicious senders of ADS-B messages. It measures the ADS-B messages TDOA at each of the deployed sensors, and then correlates the results at a central unit leveraging Global Navigation Satellite System (GNSS) (see N. El Gemayel, S. Koslowski, F. Jondral, and J. Tschan, "A low cost TDOA localization system: Setup, challenges and results," in *Positioning Navigation and Communication* (WPNC), 2013 10th Workshop on, March 2013, pp. 1-4) to synchronize the sensors. Although this can reduce the risk of an ADS-B attack, it does not provide message attribution capability ADS-Bsec obtains with advances in radio-location techniques.

Various impairments affect the reception of ADS-B broadcasts. Atmospheric factors, such as fading that occurs due to path signal loss and shadowing by large objects, reduce the received signal strength and impact the probability of receiving the message. Transmissions from other systems, such as Airborne Collision Avoidance System (ACAS) interrogations or SSR replies may cause interference, thereby reducing the range and capacity of ADS-B signals. Abadie et al. (see A. Abadie, D. Bandara, and D. Wijesekera, "A Composite Risk Model for Railroad Operations Utilizing Positive Train Control (PTC)", p. V001T06A004, April 2014) proposed a composite model that integrates various risk factors threatening the security of railroad industry in a particular infrastructure using Positive Train Control (PTC), including environmental and spectrum-based risk factors. We propose a risk-adaptive engine that focuses on addressing situations amounting from risk factors affecting ADS-B broadcasts.

Keoh et al. (see S. Keoh, "Efficient group key management and authentication for body sensor networks", *Communications* (ICC), 2011 *IEEE International Conference on*, IEEE, 2011) proposed a group key management scheme based on different key chains for a sensor network. This scheme is based on PKI and includes mechanisms for updating the group key when members join or leave the group. We use a similar scheme for the key distribution in air-to-air situations, but we rely on symmetric cryptographic keys.

SUMMARY OF THE INVENTION

The present invention provides a holistic approach that extends the ADS-B protocol to provide a viable, backwards-compatible, and effective solution to address its shortcomings. It does so by verifying not only the geographical origin of the message but also the identity of the originator. We combine a set of techniques that, when used in standalone mode, may not be able to solve the whole problem. To verify the identity of the message originator we developed a cryptographic module that embeds security metadata based on keyed-Hash Message Authentication Code (HMAC), along with the appropriate key exchange mechanism that works for both air-to-ground and air-to-air scenarios. To track the geographical origin of the message, we leverage multilateration techniques that would fail to perform message attribution if used alone to solve the ADS-B problems. We also developed a risk-adaptive cognitive engine to ensure that ADS-B transmissions would work in situations where impairments affect them.

The main contributions of this invention are listed as follows. (1) We provide a holistic approach to solve the vulnerabilities of ADS-B that addresses the problem from multiple angles. Our approach merges all the techniques we used before in one framework defining the interactions between them. This constitutes the first of a kind effort to solve ADS-B problems with such a holistic approach. (2) We conducted a thorough evaluation of our work using a test bed that mimics, as much as possible, real flight conditions and real flight data for an extensive period of time. (3) We evaluated both plain ADS-B and our secure ADS-Bsec based on the specific metrics and our findings provide a solid basis for our framework could be a good candidate to be included in the FAA's NextGen project.

Our ADS-Bsec framework solves ADS-B security problems from a holistic view by integrating cryptographic techniques with radio-location and risk-adaptive ones. This is different from other approaches in the literature, which either address only part of the problem or fail to provide an economically and technically viable solution. The framework provides confidentiality of the messages and enables attribution. No other technique has both while still keeping backwards compatibility with ADS-B. Distributed design and deployment of secure ADS-B sender and secure ADS-B receiver that are backward compatible with the current ADS-B standard without altering the message format. This is critical for commercial viability, given the large installed base of current ADS-B radios. ADS-B senders or receivers are considered as nodes that consist of a PC running Linux and a radio device (Ettus N200). The actual implementation in the airline industry would consist of FAA-approved SDRs (software designed radios). The associated hardware will be installed both in aircraft and in ATC ground infrastructure. The solution provided by the invention covers all potential situations in an ATC operation, including regular flights, unplanned missions, deviations from planned missions, and others.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

ADS-B Overview

ADS-B transmits the geographical location obtained from nearby satellites through messages modulated using Pulse Position Modulation (PPM) and broadcast every second on the 1090 MHZ band. It operates in two modes, ADS-B Out, in which aircraft broadcast their location to aircraft and ADS-B stations in transmission range, and ADS-B In, which is used for both ground-to-air and air-to-air broadcasts. ADS-B In is deployed typically on ADS-B ground components and optionally on aircraft, and receives updates from aircraft in the transmission range of about 150 nautical miles.

Figure 1:
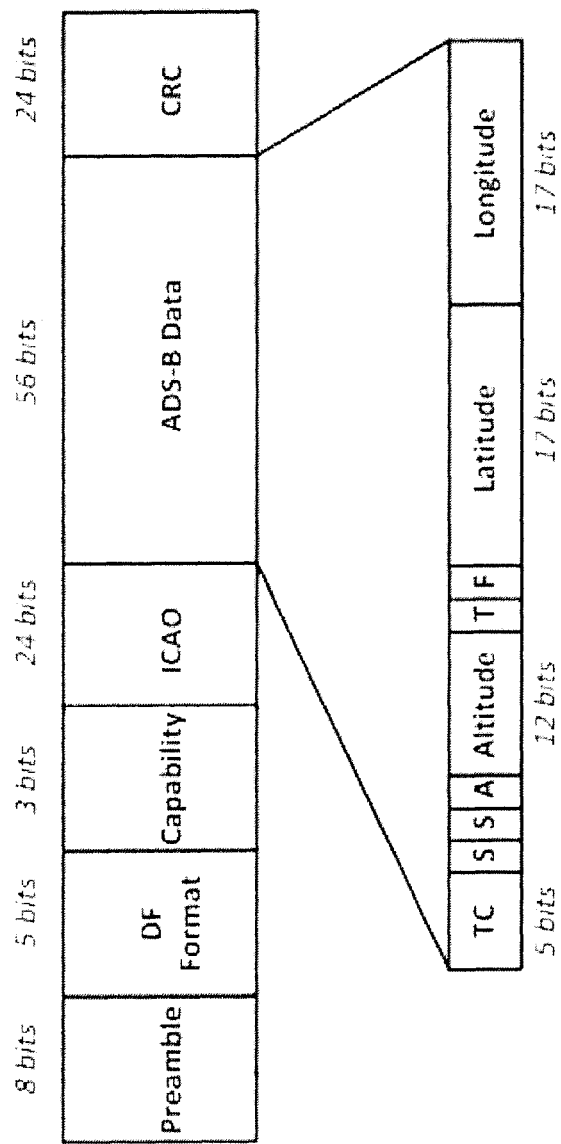
FIG. 1 is a diagram of the ADS-B format.

ADS-B is implemented either using 1090 MHZ extended squitter (so called 1090-ES) or UAT. 1090-ES is more common due to its usage in commercial aircraft, while UAT is used for general aviation. ADS-Bsec was developed using 1090 ES, but can be easily ported to UAT. The ADS-B packet format is described in FIG. 1. ADS-B data is 56 bit-long and is encapsulated inside the Mode S frames for a total of 112 bits. The preamble is 8-bit long and is used for synchronization. The 5-bit Downlink Format (DF) field is used to designate the protocol being used: 17 (binary 10001) indicates that ADS-B is in use. The 3-bit Capability field has different meaning for each type of message. The ICAO field is 24 bit-long, providing the International Civil Aviation Organization's number uniquely identifying each aircraft. Different types of ADS-B messages could provide different information: the type is indicated by the 5-bit Type Code (TC) field that could indicate aircraft identification, surface position, velocity, airborne position with barometric altitude or with GNSS height.

The International Civil Aviation Organization (ICAO) is a UN specialized agency that manages the administration and governance of the Convention on International Civil Aviation. The ICAO works with the Conventions's members and industry groups to reach consensus on international civil aviation Standards and Recommenced Practices (SARPs).

The remainder of the ADS-B data field shows the airborne position with barometric altitude, latitude, and longitude. The latter two are encoded using the Compact Position Reporting (CPR) algorithm, which constitutes a considerable gain when compared to signed binaries (17 bits versus 32 bits). Every location is encoded in two ADS-B messages, one even and one odd, due to the nature of the CPR algorithm. Even/odd property can be found in bit 22 of the ADS-B data. Finally, the 24-bit CRC field is used to detect errors in transmission.

ADS-Bsec Overview

To assess the ADS-Bsec effectiveness, we developed an ADS-B attack taxonomy based on two criteria: the difficulty of implementing the attack and the equipment used to carry out the attack. It consists of the following three categories:

Medium-level attacks: Includes most traditional cyber attacks, such as eavesdropping, replay, and message injection, where attackers generate random GPS coordinates and transmit it via ADS-B messages using fixed radios.

Advanced-level attacks: Generate more realistic aircraft paths with a flight simulator, sending it from fixed radios.

Expert-level attacks: This category includes aircraft coordinates generated by a flight simulator sent from a mobile radio device (e.g. flying drone).

Providing authenticity and integrity to ADS-B messages without altering its format would come at the expense of existing fields. Transmitting additional security data would cripple scalability since the 1090 MHZ band is narrow and overused. In addition, potential solutions must provide adequate exchange mechanisms of cryptographic keys among ATC nodes, which was not envisioned in the original design. Finally, message attribution must be included so fraudulent ADS-B messages would be associated its producers.

ADS-Bsec was designed to make the current ADS-B infrastructure resilient by fully addressing the message authentication, message integrity and attribution requirements, while maintaining backwards compatibility with the current format. Current ADS-B limitations the requirement of backwards compatibility force potential solutions to address a wide spectrum of implementation details.

Figure 2:
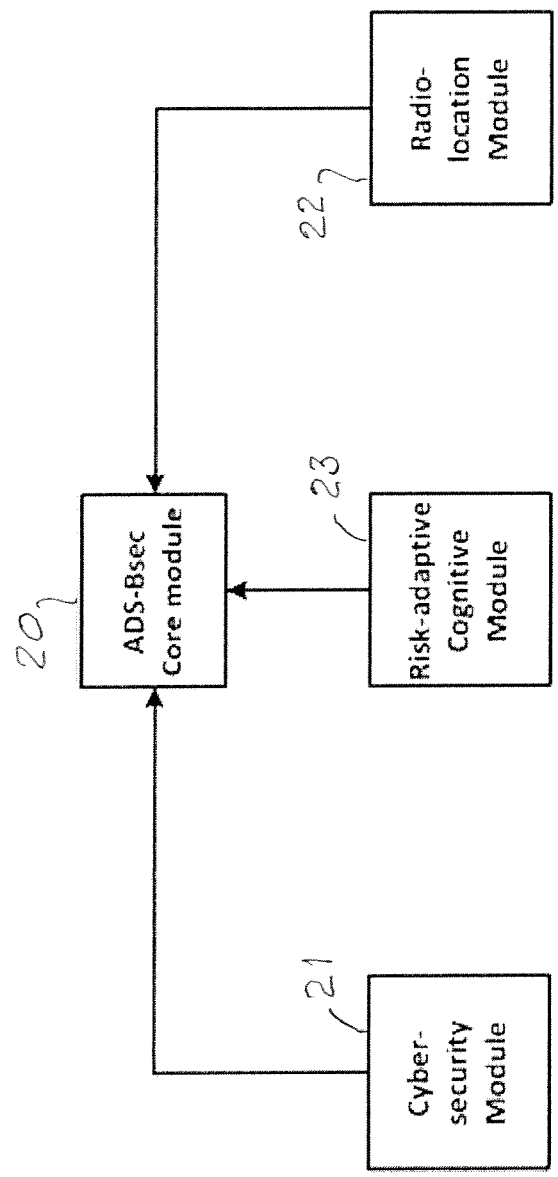
FIG. 2 is a block diagram of the ADS-Bsec implementation according to the invention.

As a result, ADS-Bsec adopts a holistic view relying on the integration of multiple components, as seen in FIG. 2. The core module 20 receives reports from its sub-modules to determine the validity of location updates. The cyber-security module 21 enforces authenticity and integrity using HMAC-based metadata supported by a proper cryptographic keys exchange, which works in both aircraft-to-aircraft and aircraft-to-ground scenarios. The radio-location module 22 leverages multilateration to obtain the true location of fake ADS-B message senders. Finally, the risk-adaptive module 23 detects risks posed by impairments that may affect the broadcasting of ADS-B messages and proposes ways of addressing them. The framework components are detailed in the following papers, the disclosures of which are incorporated herein by reference:

T. Kacem, D. Wijesekera, and P Costa, "Integrity and authenticity of ADS-B broadcasts", *IEEE Aerospace Conference (AeroConf)*, Big Sky, Mont., USA, March 2015.

T. Kacem, D. Wijesekera, P. Costa, J. Carvalho, M. Monteiro, and A. Barreto, "Key distribution mechanism in secure {ADS-B} networks", in *Integrated Communication, Navigation and Surveillance Conference (ICNS)*, Herndon, Va., USA, April 2015.

T. Kacem, D. Wijesekera, P. Costa, J. Carvalho, M. Monteiro, and A. Barreto, "Secure ADS-B Design \& Evaluation", *IEEE International Conference on Vehicular Electronics and Safety (ICVES)*, November 2015, Yokohama, Japan.

T. Kacem, J. Carvalho, D. Wijesekera, P. Costa, M. Monteiro, and A. Barreto, "Risk-Adaptive Engine for Secure ADS-B Broadcasts", *SAE AeroTech*, September 2015, Seattle, Wash.

T. Kacem, D. Wijesekera, P. Costa and A. Barreto, "Secure ADS-B framework ADS-Bsec", *IEEE Intelligent Transportation Systems (ITSC)*, 2681-2686, November 2016, Rio di Janeiro.

T. Kacem, D. Wijesekera, P. Costa and A. Barreto, "An ADS-B Intrusion Detection System", *The 15th IEEE International Conference on Trust, Security and Privacy in Computing and Communications (IEEE TrustCom-16)*, 544-551, August 2016, Tianjin, China.

Monteiro, Marcio, Alexandre Barreto, Thabet Kacem, Jeronymo Carvalho, Duminda Wijesekera, and Paulo Costa, "Detecting malicious ADS-B broadcasts using wide area multilateration", *Digital Avionics Systems Conference (DASC)*, 2015 IEEE/AIAA 34th, pp. 4A3-1, IEEE, 2015.

Monteiro, Marcio, Alexandre Barreto, Thabet Kacem, Duminda Wijesekera, and Paulo Costa, "Detecting malicious ADS-B transmitters using a low-bandwidth sensor network", *Information Fusion (Fusion)*, 2015 18th International Conference, pp. 1696-1701, IEEE, 2015.

Overview of the ADS-Bsec Implementation

The cyber-security component provides authenticity and integrity to ADS-B messages without changing the message format. It includes a HMAC-based metadata instead of the CRC. The HMAC-based verification is a robust replacement of the CRC, which is used for bit error verification and can be breached at software-level, as it provides the same capabilities while adding key features. As a result, the component is capable of detecting any category of attacks provided that the secret information is not compromised. The overview of this component is shown in FIG. 3.

Figure 3:
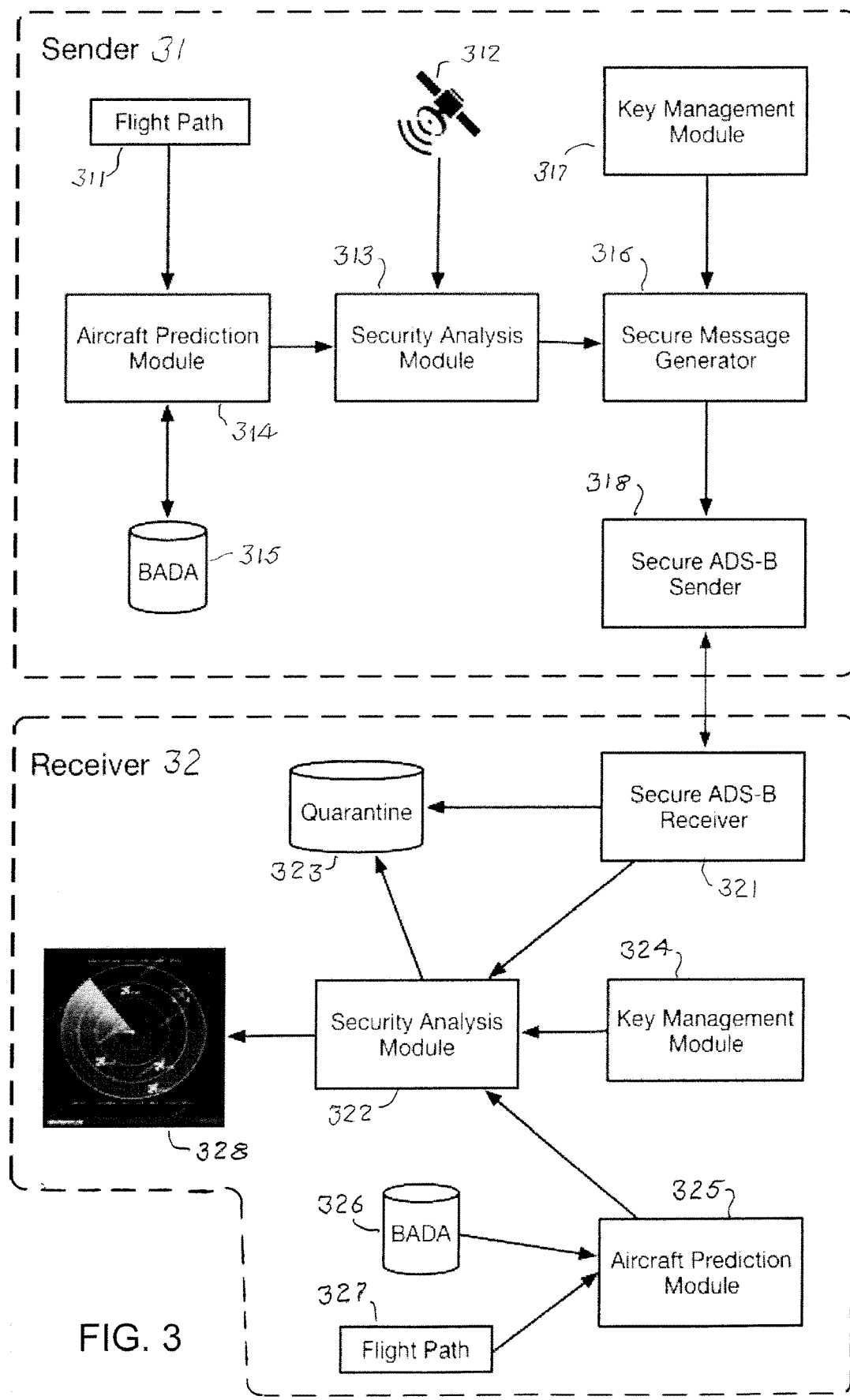
FIG. 3 is a block diagram illustrating the cyber-security component of the ADS-Bsec implementation according to the invention.

As shown in FIG. 3, this framework comprises a sender 31 and a receiver 32. The sender receives inputs from the flight plan 311 and a nearby GPS satellite 312. The GPS information is input to a security analysis module 313 which also receives an input from an Aircraft Prediction Module 314. The Aircraft Prediction Module 314 also receives inputs from the flight plan 311 and an aircraft performance database (BADA) 315. The Security Analysis Module 313 provides an output to a Secure Message Generator 316. The Secure Message Generator 316 also receives an input from a Key Management Module 317 and provides an output to a Secure ADS-B Sender 318.

The receiver 32 communicates with the sender 31 with a Security ADS-B receiver 321 which provides inputs to a Security Analysis Module 322 and a Quarantine database 323. The Security Analysis Module 322 also receives inputs from a Key Management Module 324 and an Aircraft Prediction Module 325. The Aircraft Prediction Module, in turn, receives inputs for a BADA database 326 and the Flight Plan 327. The Security Analysis Module 321 provides an output to a flight visualization module 328.

At the sender side, the Aircraft Prediction Module 314 infers flight trajectory combining flight path information with the Base of Aircraft Data (BADA) 315 profiles. Then, during the flight, the Security Analysis Module 313 cross-checks the geographical coordinates from the predicted trajectory against those obtained from satellites to detect GPS spoofing attacks. Valid coordinates are then encoded in secure ADS-B messages with input from the Key Management Module 317, and transmitted by the Secure ADS-B Sender 318 using PPM modulation.

Messages received by the Secure ADS-B Receiver 321 are passed to the Security Analysis Module 322, which obtains the HMAC key from the Key Management Module 324 and verifies the validity of the HMAC-based metadata. The predicted position at a time t, obtained from the Aircraft Prediction Module 325, is also computed when verifying whether the location update inferred from the ADS-B messages is within the normal range, erroneous, or a product of a replayed or fake message. Fraudulent messages are quarantined in the Quarantine database 323 for further analysis. Otherwise, the location update is plotted on the radar display of the Visualization Module 328.

Secure Message Generation for ADS-B Out

Figure 4:
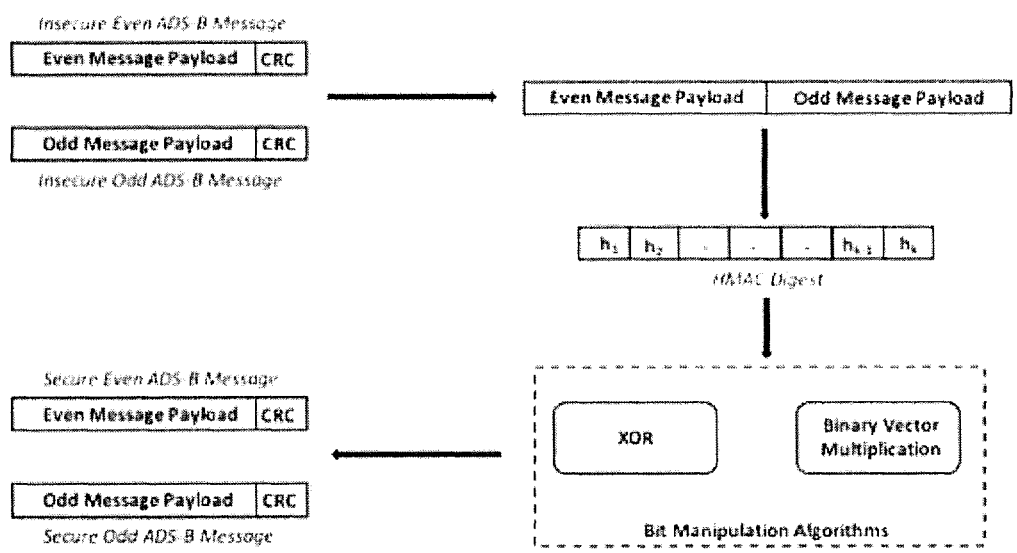
FIG. 4 is a diagram illustrating the message generation for ADS-B Out.
Figure 4:
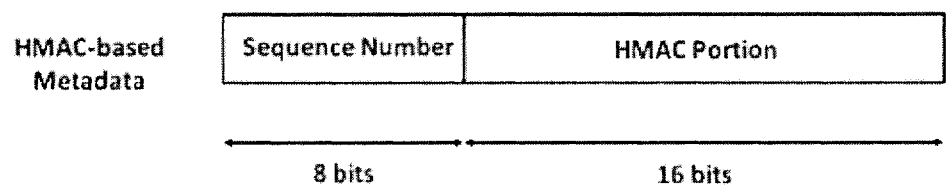

The following describes the generation of secure ADS-B messages in air-to-ground scenarios. Since geographical coordinates are encoded in two ADS-B messages, HMAC-based metadata used in ADS-Bsec are encoded in the space originally allocated to the CRC fields of two messages, as described in FIG. 4. The payloads of the even and odd ADS-B messages are concatenated, the CRCs are excluded, and the HMAC algorithm is applied using the key. The outcome is a digest varying in size according to the algorithm being used, which is then split into several portions proportional to 16 (the size reserved for the HMAC digest). FIG. 4 corresponds to a case where the HMAC digest is 128 bit-long. To fit the security metadata to a legacy, fixed-size ADS-B message we apply different rounds of a chosen bit-manipulation algorithm that narrows down the number of portions to 2, which would be part of the final security metadata.

Secure Message Generation for ADS-B IN and ADS-B Out

Figure 5:
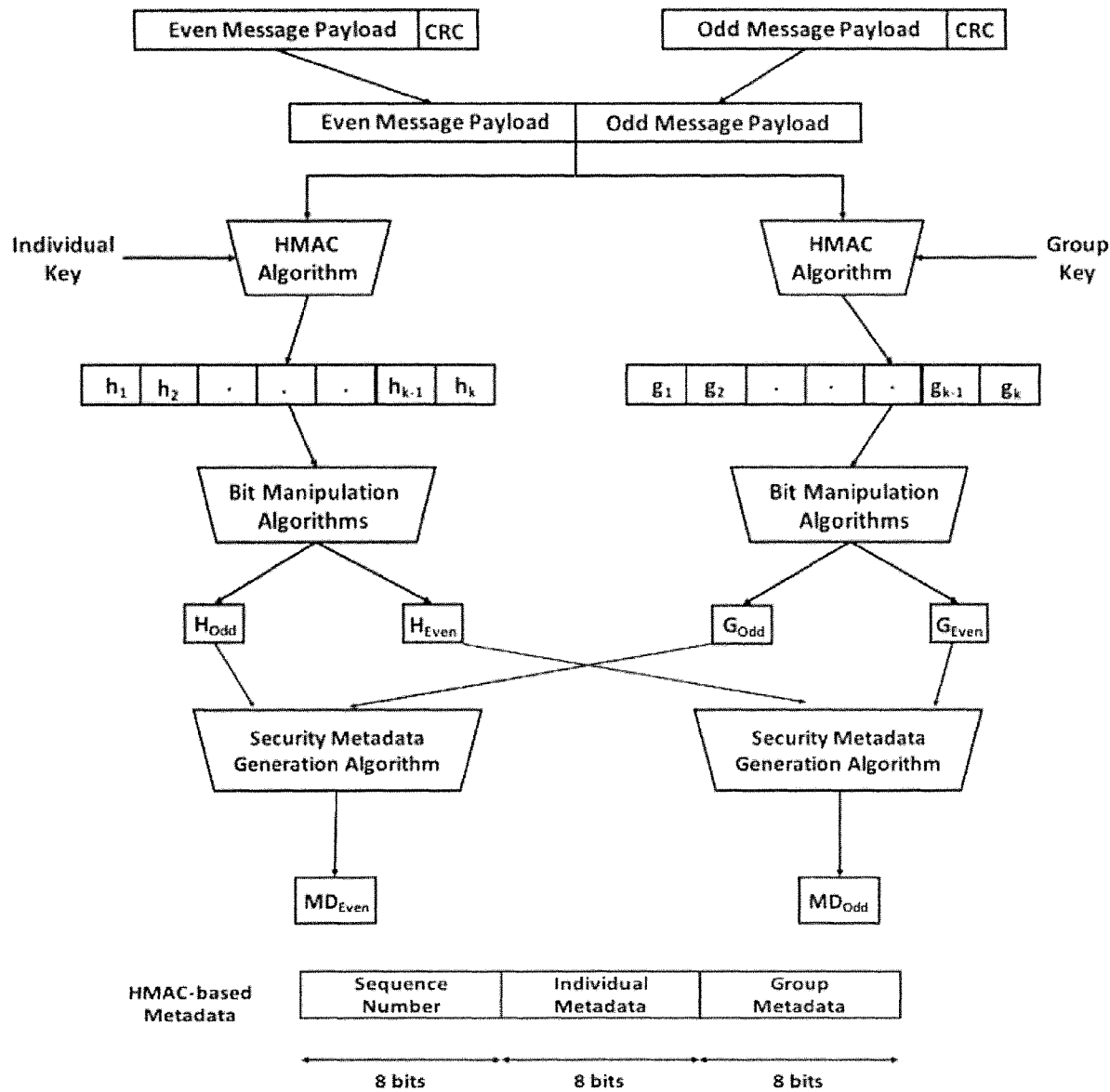
FIG. 5 is a diagram illustrating the message generation for ADS-b In and ADS-B Out.

The secure message generation for both ADS-B IN and ADS-B Out, which includes ground-to-air and air-to-air communication, is shown in FIG. 5, and is similar to the ADS-B Out-only scenario. The difference is that it applies two different HMAC algorithms with two different keys to the string containing the concatenation of the payloads of the two ADS-B messages referring to a location. The first algorithm uses the same key of the ADS-B Out to communicate with ground components and the second algorithm uses the key used for ADS-B In to communicate with nearby aircraft. In parallel, the two resulting digests are split to k portions proportional to 8, because the HMAC-based data is now 8 bit-long for the individual metadata (for ADS-B Out) and group metadata (for ADS-B In). We also apply to each set of portions different rounds of chosen bit manipulation algorithms, which produces a pair of string for each case. Finally, we cross-pick the two portions from each set before creating the final security metadata that will be part of the secure ADS-B message.

Key Exchange for Air-to-Ground Communication

The HMAC key exchange mechanism for ADS-B Out works in air-to-ground communication, and we focus on two scenarios: when there are no changes to the flight path, and under unforeseen conditions causing flight path changes. The air space is divided into different zones under the jurisdiction of different ATC centers, with a granularity that depends on factors such as proximity to terminal areas. Prior to taking off, an aircraft needs to obtain different authorizations from the ATC centers which zones are included in its path. We leverage this constraint to integrate our key exchange mechanism, where each aircraft has a different key to authenticate itself in each zone. We use a secret key exchange protocol because PKI schemes would be hard to implement (e.g., international key sharing procedures when no pre-existing agreements exist).

Ideally, once the aircraft gets the list of keys it would be cleared to proceed, with knowledge of the geographical limits of each zone and guaranteed verification of its ADS-B messages. During the initial key exchange procedures, the ATC center of departure that has the ability to establish secure handshakes with other ATC centers included in the flight path (secure communication channels between ATC centers is assumed). Unforeseen situations (e.g., mechanical problems or weather conditions) may derail this process and cause aircraft to enter zones without the proper key. Developing a mechanism for such conditions is non-trivial, and malicious senders could impersonate an aircraft and trick the ATC center into revealing its key. Therefore, the ATC would need to establish voice contact and verify its validity (e.g., querying about specific flight details, such as flight number or previous zones it came from). Absence of response or wrong answers would suggest a malicious actor. Typically, when an aircraft changes its path, it would inform its new destination to the ATC node and the ATC node would then inform the ATC center associated with the location in question about the change so that they could take adequate procedure. In particular, the ATC of the new zone would receive a temporary key, along with parameters to compute a new key after authenticating the aircraft. When the aircraft enters the new zone, it will receive a challenge message from the ATC and, upon correct response, both parties would compute the new key based on the temporary one and the parameters that both possess.

Key Exchange for Air-to-Air Communication

For aircraft equipped with ADS-B In requires a distinct key exchange mechanism, since other aircraft need to verify the validity of ADS-B messages received in its range of transmission. ADS-Bsec uses group keys, where the granularity of a group is inspired by the ATC air space division. One key aspect about the group key is that it is never sent over the air, but computed off-line based on keys obtained from multiple one-way key chains. Only the seeds of each chain are preloaded prior to takeoff, and the computation is also based on the time of the day. We subdivide the day into intervals, where the length of each interval depends on its location: zones near terminal would need longer intervals than zones farther away from it. Then, depending on the number of one-way key chains (typically we envision two), we start extracting the last key from each chain and feed them to a hash function. This function is different from the hash function used to derive the one-way key chain from the seed. In the next interval for the same group, we use the previous keys from each chain to generate the next group key. We use multiple group keys per zone, because each time an aircraft joins or leaves the group there needs to be a new group key.

In order to generalize this process, we compute a security association grid, where each one consists of the pair of seed keys used to compute the key chains, the algorithms used to generate the group key, the schedule indicating which keys to be used in each time slot, and the geographical limits of each zone. The rows and columns of the grid correspond to ATC zones. However, we make an extra virtual subdivision in each zone to distinguish regions that border with other zone from regions that do not. Based on this, if the aircraft is located in an interior zone, its security association is located in the diagonal of the grid. Otherwise, that means it is a region bordering other regions from other zones. Therefore, new security associations are computed based on the ones located on the diagonal.

Algorithm 1 shows how we use Shamir's key distribution scheme (see A. Shamir, "How to share a secret", *Communications of the ACM*, 22(11), pp. 612-613, 1979) to spread seeds among two or more adjacent zones. Line 1 of Algorithm 1 states the pre-conditions on the security associations in the grid. Lines 2-3 mark the start of the double-nested loop to iterate the grid. Lines 5-12 show the computation of the security association by first using Shamir's procedure to split two secrets and store the result in two arrays, secret1 and secret2, in lines 5 and 6. Lines 7-10 assign the seeds for zone i and j while lines 11 and 12 invoke Shamir's restoration procedure to recreate the two secrets, which would become the seeds for the border regions of the zones in question.

Algorithm 1: Generation of Group Key Seeds in the Grid

1. Initialize the matrix by creating a security association object $a_{ij}$ for each adjacent zones I and j along with two secrets secret1 and secret2;

Algorithm 1: Generation of Group Key Seeds in the Grid 2.   for i=1 ... N do
3.     for j=1 ... N do
4.       if $a_{ij}$ != null then
5.         string shares1[2] = shamirSplit(secret1,2);
6.         string shares2[2] = shamirSpllit(secret2,2);
7.         $a_{ii}$.seed1 = shares1[0];
8.         $a_{ii}$.seed2 = shares2[0];
9.         $a_{jj}$.seed1 = shares1[1];
10.        $a_{jj}$.seed2 = shares2[1];
11.        $a_{ij}$.seed1 = shamirRestore(shares1);
12.        $a_{ij}$.seed2 = shamirRestore(shares2);

Secure Message Verification at the Receiver for ADS-B In and ADS-B Out

ADS-Bsec messages are validated at the receiver either by an aircraft or a ground component using Algorithm 2. Lines 2-4 retrieve the ADS-B message, the ICAO identifier, and the sequence number from it. Lines 5-9, if ADS-B In is deployed, first retrieve the seeds from each key chain for the specific time interval, and next compute the group key. We use the Coordinated Universal Time (UTC) to know the seeds to be used in a given time interval. Conversely, if ADS-B In is deployed in ground components, lines 10 and 11 get the key to be used for air-to-ground message validation. Lines 12-18 create and/or retrieve the two hash-maps, namely icao_hashmap and the seq_hashmap. The former uses the ICAO identifier as key to create the latter as mapped content. The hash-map seq_hashmap uses the sequence numbers as key, and the mapped content is a queue containing at most two ADS-B messages having the same sequence numbers. We use this double-nested hash-map structure to classify the received messages in buckets, which greatly simplifies the verification process. Lines 19-40 show the verification process. Lines 20-22 generate the concatenated string from the payload of the even and odd ADS-B messages located in the same queue. In case ADS-B In is deployed on an aircraft, lines 24-26 generate the group-based metadata before checking it against the ones retrieved from the received messages in lines 27-30. If a match is found, the corresponding location is plotted on the radar display, otherwise corresponding messages are quarantined. Similar process is performed if the ADS-B In is deployed on a ground component, but we use the ground-to-air HMAC key to verify the metadata. Finally, lines 39 and 40 trigger a timeout in case one or both ADS-B messages in process of being validated are not received.

Algorithm 2: Data Verification by Nearby Aircraft 1.   while new ADS-B message is received do
2.     msg = getADSBMsg( );
3.     icao = getICAO(msg);
4.     seqNb = getSeqNb(msg)\;
5.     if ADS-B In is deployed on aircraft do
6.       current = getCurrentUTCTime( );
7.       key1 = getKeyFromChain(current,0);
8.       key2 = getKeyFromChain(current,1);
9.       gpKey = computeGpKey(key1, key2);
10.     else
11.       key = getHMACkey( );
12.     if exist(icao_hashmap,icao) then
13.       seq_hashmap = getHashmap(icao_hashmap, icao);
14.       queue = getQueue(icao_hashmap, seqNb);
15.     else
16.       queue = createQueque( );

Algorithm 2: Data Verification by Nearby Aircraft

```
17.         seq_hashmap = createHashmap(queue);
18.         seq_hashmap.getQueue( ).enqueue(msg);
19.         if size(queue)==2 then
20.             even_msg = queue.getMsg(0);
21.             odd_msg = queue.getMsg(1);
22.             longMsg = concat(even\_msg, odd\_msg);
23.             if ADS-B In is deployed on aircraft then
24.                 digestGp = hmac(longMsg, gpKey);
25.                 gh_{even} = splitAndManip(digestGp,0);
26.                 gh_{odd} = splitAndManip(digestGp,1);
27.                 if check(gh_{even},gh_{odd}) then
28.                     display(even_msg, odd_msg);
29.                 else
30.                     quarantine(even_msg, odd_msg);
31.             else
32.                 digest = hmac(longMsg, key);
33.                 ih_{even} = splitAndManip(digest,0);
34.                 ih_{odd} = splitAndManip(digest,1);
35.                 if check(ih_{even},ih_{odd}) then
36.                     display(even\_msg, odd\_msg);
37.                 else
38.                     quarantine(even\_msg, odd\_msg);
39.         else
40.             timeoutAndVerify( );
```

Risk-Adaptive Cognitive Engine

Although ADS-B messages are broadcast every second over the 1090 MHZ band using PPM modulation, several physical properties of ADS-B signal may prevent proper reception of these messages. These disruption factors are listed below:

Fading: caused by path losses of signals and shadowing by large objects. Causes of loss include atmospheric moisture absorbing the Received Signal Strength (RSS) and wind \& temperature varying during the day, affecting the quality of the received signal.

Interference: caused by systems sharing the same portion of the spectrum, such as SSR replies, ACAS interrogations, and Mode S radar replies.

Usually the total transmit power of Mode S transponders fluctuates between 21 and 27 dBW, while the free-space path loss can be computed using First Equation 1.

$$L = G_T G_R \left(\frac{\lambda}{4\pi d}\right)^2 \quad (1)$$

$G_1$ and $G_1$ are the transmitter and receiver gains, $\lambda$ is the wavelength of the signal, and d is the distance between the transceivers. The transmit power is important for ADS-B because it impacts the ability to receive the corresponding ADS-B messages. The total path loss includes the free-space path loss and other miscellaneous losses. Once the total transmit power and the total path loss are known, we can compute the RSS and the Signal to Interference and Noise Ratio (SINR), which is a function of the SINR and the sum of all noise from the disruption factors listed above. The Bit Error Rate (BER) of an ADS-B frame can be expressed by equation 2:

$$P_b = \frac{1}{2} e^{-\frac{SINR}{2}} \quad (2)$$

Also, the Frame Error Rate (FER) can be measured as a function of the BER, given that plain ADS-B can correct up to three bit errors. We designed and performed an evaluation based on computer simulations to assess the impact of the ADS-Bsec to FER. The results obtained show that BER and FER converge to zero when the SINR is greater than 10 dBW, detailed in T. Kacem, J. Carvalho, D. Wijeskera, P. Costa, M. Moterio, and A. Barreto, "Risk-Adaptive Engine for Secure ADS-B Broadcasts", SAE AeroTech, September 2015, Seattle, Wash. In addition, based on the disruptive factors to reception of broadcast ADS-B messages, we developed an ontology to model these properties using Protégé' as described by Knublauch, Holger, Matthew Horridge, Mark A. Musen, Alan L. Rector, Robert Stevens, Nick Drummond, Phillip W. Lord, Natalya Fridman Noy, Julian Seidenberg, and Hai Wang. "The Protégê OWL Experience", in OWLED. 2005. We use logical rules developed in Semantic Web Rule Language (SWRL) (see Horrocks, Ian, Peter F. Patel-Schneider, Harold Boley, Said Tabet, Benjamin Grosof, and Mike Dean, "SWRL: A semantic web rule language combining OWL and RuleML", W3C Member submission 21 (2004): 79) to infer their effect on ADS-B signal and possible counter-measures to avoid such disruptions, ranging from increasing the signal transmit power to avoiding certain areas.

Radio-Location Module

Multilateration works by synchronizing and correlating the TDOA of a message received by several sensors. In the context of ADS-B, its main advantage is the ability to reuse existing infrastructure, without modifying ADS-B message format, in order to track the source of transmitted messages. However, one caveat is that location accuracy is sensitive to timing.

Figure 6:
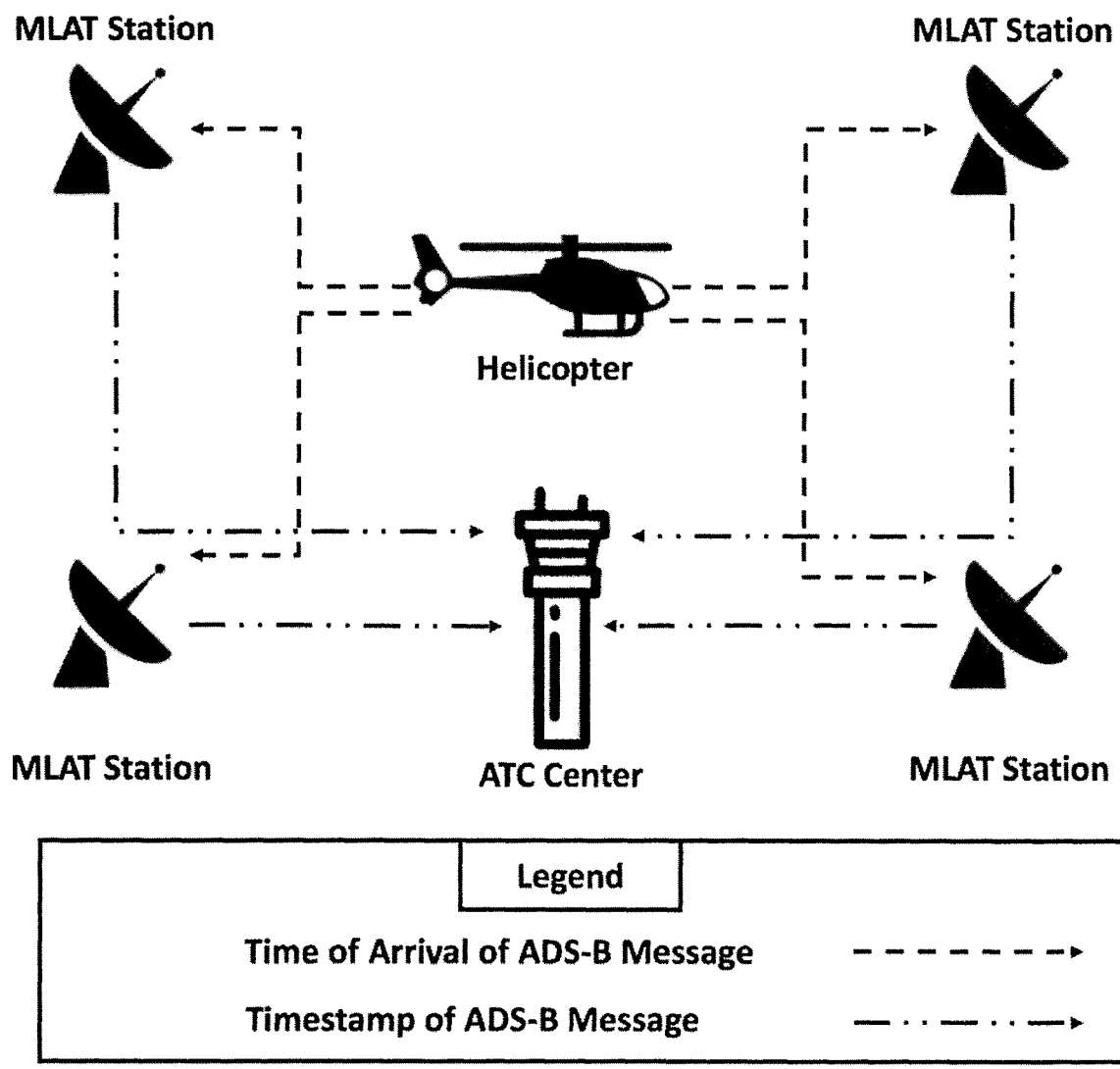
FIG. 6 is a block diagram showing a radio-location component overview.

The radio-location component uses multilateration to detect malicious ADS-B transmitters. Multilateration alone cannot address all ADS-B vulnerabilities, but it is part of the solution described in our framework overview. FIG. 6 shows different multilateration sensors, labeled MLAT Stations, used by the Radio-location module to obtain the time-stamps of the same ADS-B message and report to the central unit, usually deployed on the ATC center. However, TDOA faces real bandwidth challenges in the context of Wide Area Multilateration due to network delays, as it requires a digitized version of the signal to be stored, timestamped and transmitted to the central correlation unit. This is the primary reason to use Time Difference of Timestamps (TDOT) instead of TDOA, where each time-stamp is the sum of the time of arrival and the processing time of an ADS-B message. We also timestamp the decoded messages that are less than 1% of the digitized ADS-B message, reducing the network bandwidth usage.

Computing the TDOT

We refer to time-stamp as the sum of the time of arrival of an ADS-B message and the processing time of that message, the time needed to demodulate, error-check, and time-stamp that message. Let $t_n$ and $p_n$ be the time of arrival and processing time of an ADS-B message at the $n^{th}$ sensor. Because ADS-B messages travel at the speed of light, one microsecond error in timing leads to about 300 meters of error when measuring distance. Therefore, we modeled $p_n$ as a random variable with a Gaussian $\mathcal{N}(\mu_n, \sigma_n^2)$ distribution. The time-stamp $\tau_n$ of a message at sensor n can be expressed as in Equation 3 where $t_n$ is the time on the message at sensor n and depends on the distance between the emitter and the sensor as expressed in Equation 4. In Equation 4, C is the speed of light. The coordinates $(x_n, y_n, z_n)$ and $(x_E, y_E, z_E)$ are, respectively, the Cartesian coordinates of sensor n and the emitter E.

$$\tau_n = t_n + p_n \qquad (3)$$

$$t_n = \frac{\sqrt{(x_n - x_E)^2 + (y_n - y_E)^2 + (z_n - z_E)^2}}{C} \qquad (4)$$

At the central unit, TDOT between each pair of sensors i and j is measured according to the following Equation 5:

$$\tau_i - \tau_j = (t_i - t_j) + (p_i - p_j) \qquad (5)$$

Assuming all sensors have the same hardware, drivers and software, we can assume that the mean processing time and the variance are the same as well, namely $\mu_n = \mu$ and $\sigma_n^2 = \sigma_2$ for all n sensors. Therefore, the TDOT becomes:

$$\tau_i - \tau_j = (t_i - t_j) + [\mu + \mathcal{N}(0, \sigma^2) - \mu - \mathcal{N}(0, \sigma^2)] = (t_i - t_j) + [\mathcal{N}(0, \sigma^2) - \mathcal{N}(0, \sigma^2)] \qquad (6)$$

Furthermore, because a Gaussian distribution with zero mean is symmetric around zero, $\mathcal{N}(0, \sigma^2)$ is statistically equivalent to $-\mathcal{N}(0, \sigma^2)$. Thus, the final formula to measure the TDOT is expressed in Equation 7.

$$\tau_i - \tau_j = t_i - t_j + \mathcal{N}(0, 2\sigma^2) \qquad (7)$$

In Equation 7 $\mathcal{N}(0, 2\sigma^2)$ is the estimation noise measured as the standard deviation. Typically, at least four MLAT sensors are needed to solve this system of equations and determine the location of the emitter. Note that by the time of this writing we have been focusing on using multilateration against immobile attacks, which has been the most common known threat. Our implementation can be extended to compute altitude information, which would enhance the effectiveness of the Radio-location module against expert-level attacks. This requires an extra MLAT sensor to achieve the same level of performance we obtained with the algorithms above. The implementation presented here is effective against the vast majority of potential attacks.

Validating ADS-B Messages

ADS-B message validation process is shown in Algorithm 3. In line 1, different arrays are initialized in order to store the location of each sensor, as well as each emitter, in Cartesian coordinates. The first is collected from the decoded ADS-B messages, while the latter is known and does not change. In lines 2-3, the locations obtained of each emitter are stored while the elapsed time is less than the end time of operation. In line 4, the multilateration algorithm determines the real location of the emitter. Line 5 applies a Kalman filter to improves the quality of measurements that may be affected by clock drifts based on the collected TDOT values. Line 6 computes the distance between the (X,Y) components of the estimated versus the reported location. The use of this horizontal difference is motivated by the nature of attackers we consider that use immobile radio devices, and therefore x and y components would be enough to locate potential attackers. Finding the position of mobile radios (e.g., in drones), would require MLAT sensors deployed on other aerial vehicles. Finally, lines 7-10 compare that value to the threshold, which when exceeded indicates an attacker broadcasting malicious messages at that reported position.

Algorithm 3: Detection of Bogus ADS-B Messages

Figure 7:
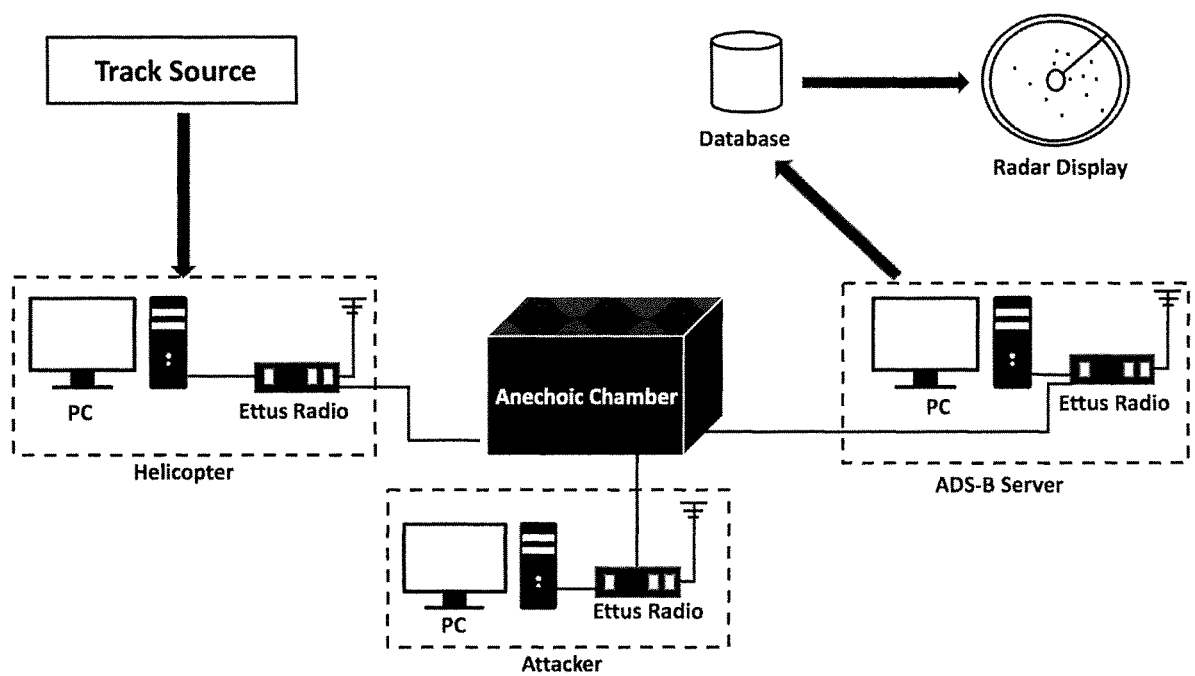
FIG. 7 is a block diagram illustrating the ADS-B testbed.

1. Initialize arrays to store the Cartesian coordinates of both the MLAT sensors and the emitters;
2. while t<endTime do
3. Store the coordinates of each emitter in its corresponding array;
4. Run the multilateration algorithm to determine the location of the emitter based on the collected TDOT values;
5. Apply Kalman Filter to improve the location estimation;
6. Compute the horizontal difference $h_{Diff}$ between the estimated and reported position;
7. if $h_{Diff}$<Threshold then
8. ADS-B message is valid
9. else
10. ADS-B message is malicious Evaluation of the Cyber-Security Component In order to evaluate the performance of the cyber-security component, we setup a test bed, as shown in FIG. 7 to send and receive plain and secure ADS-B messages. The components of the test bed are listed below:

Track Source: tracks are obtained by extracting the output of the aircraft prediction module.

Node: A Ubuntu Linux PC with GNU radio, and an Ettus N200 radio device. There are three types of nodes: sending nodes, receiving nodes, and attacker nodes that, respectively, send valid ADS-B messages, receive ADS-B messages, or send malicious ADS-B messages.

Anechoic Chamber: isolates the radio communication from outside noise and interference. All radio devices are placed inside and linked to PCs via Gigabit Ethernet.

Database: stores coordinates of valid locations extracted from valid ADS-B messages in SQLite database.

Radar Display: plots in real-time the positions of aircraft using Google Earth.

The aircraft prediction module generated the coordinates for an Airbus A320 1-hour flight from Toulouse (TLS) airport to Paris Orly (ORY), which corresponds of 7200 runs of ADS-B messages were used in two experiments. In the first experiment, data was sent in plain ADS-B messages, and we measured the time both at the ADS-B sender and at the ADS-B receiver. The second experiment had an identical procedure, except that we added 7200 runs of malicious ADS-B messages resulting from continuous ghost aircraft injection near the whole trajectory of the flight in consideration. We also measured the sending time and receiving time at both the secure ADS-B and secure ADS-B receiver.

Figure 8:
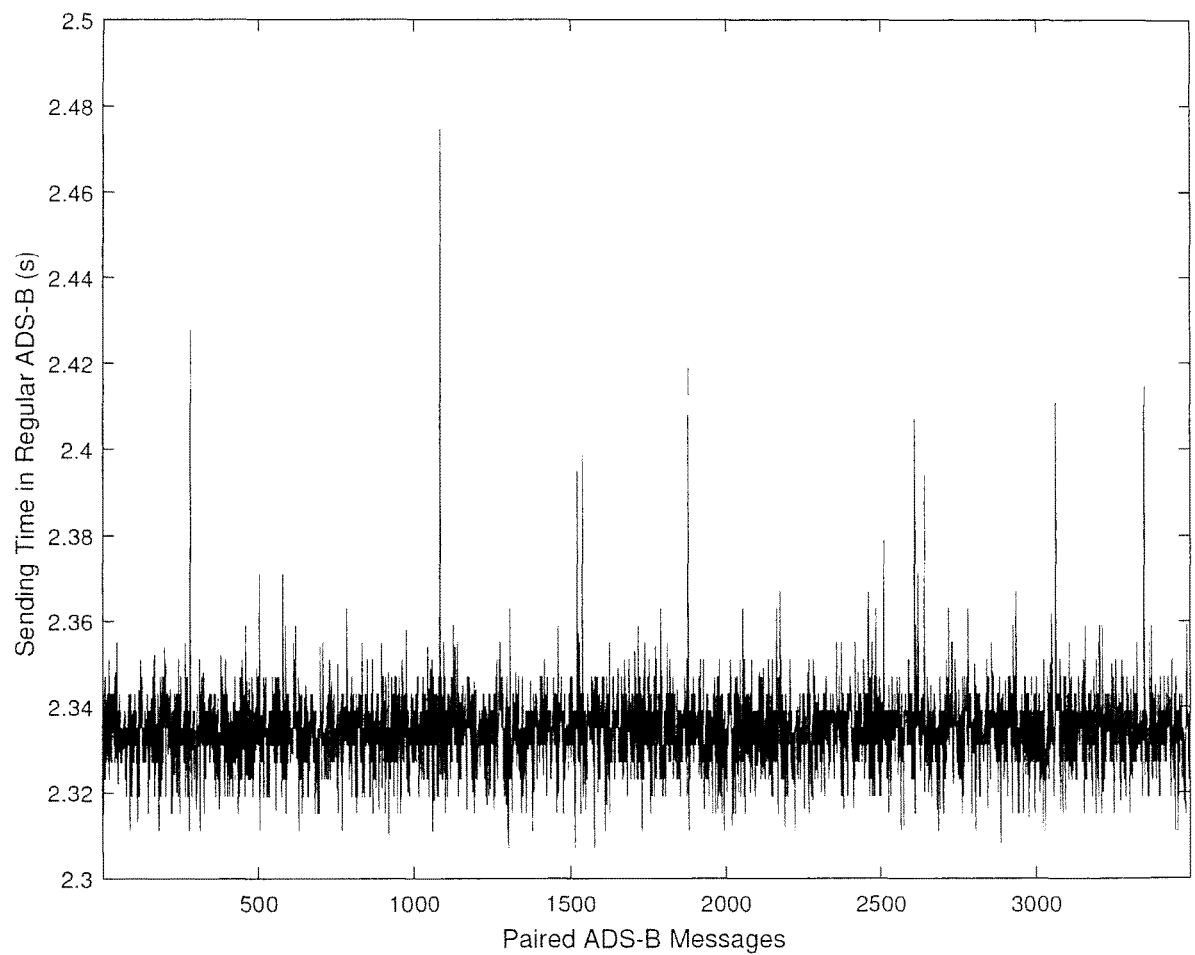
FIG. 8 is a graph showing sending time of plain ADS-B.
Figure 9:
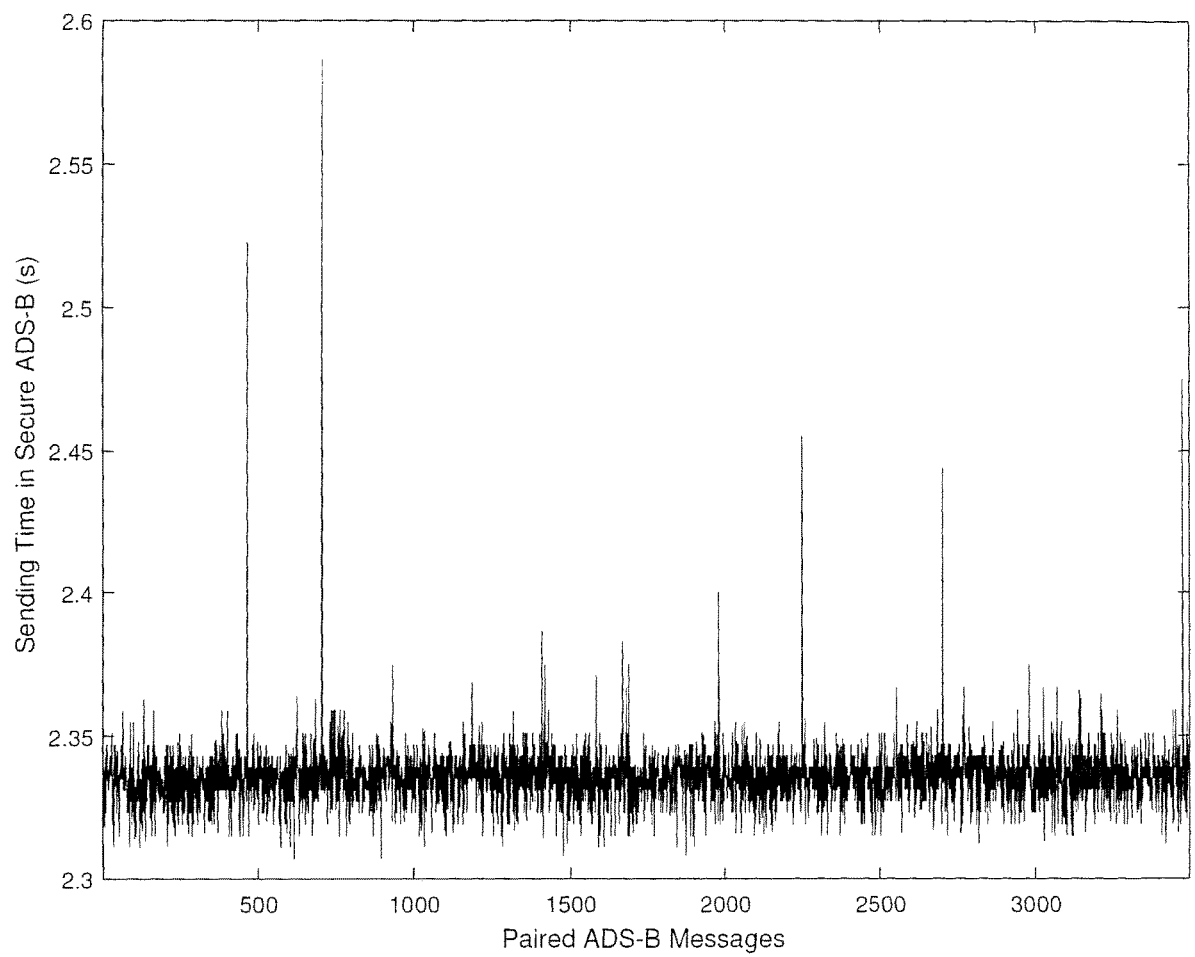
FIG. 9 is a graph showing sending time of secure ADS-Bsec.

The sending time, described in FIGS. 8 and 9 shows that they are within close range. Both figures plot the sending time measured in seconds in function of each pair of even and odd ADS-B message encoding a location every second. The plain sending time ranges from 2.3 seconds to 2.48 seconds, while the secure sending time ranges from 2.3 seconds to 2.6 seconds. The computation show the overhead of the cryptographic operations to be about 1.2E-3 seconds, which is negligible.

Figure 10:
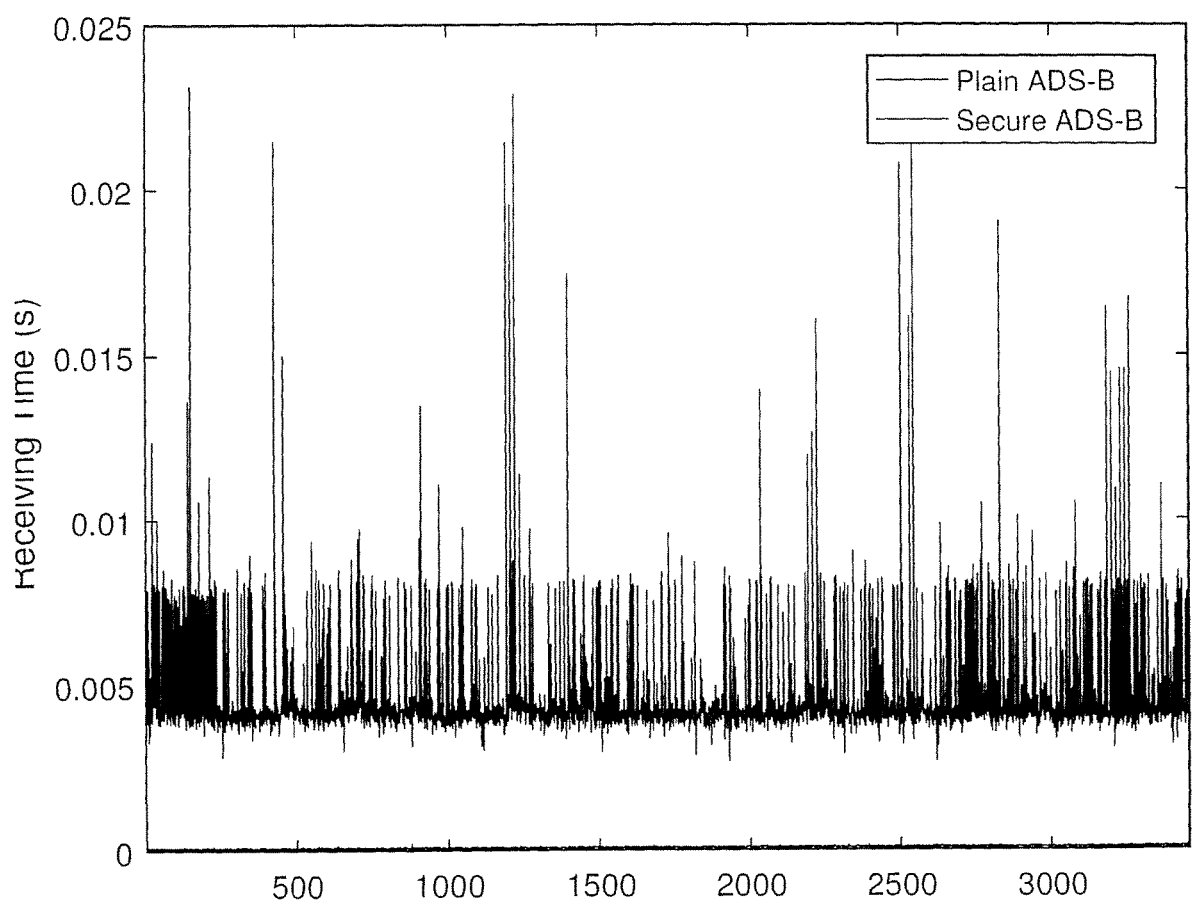
FIG. 10 is a graph showing the receiving time in plane ADS-B and secure ADS-Bsec.

Conversely, a jitter of about 4.5E-3 seconds can be observed in FIG. 10 between the receiving times for plain ADS-B versus secure ADS-B. This is substantially better than the jitter of SSR, which is about 12 seconds. Therefore, we can conclude that our cyber-security component is stable.

Evaluation of the Radio-Location Component

Figure 11:
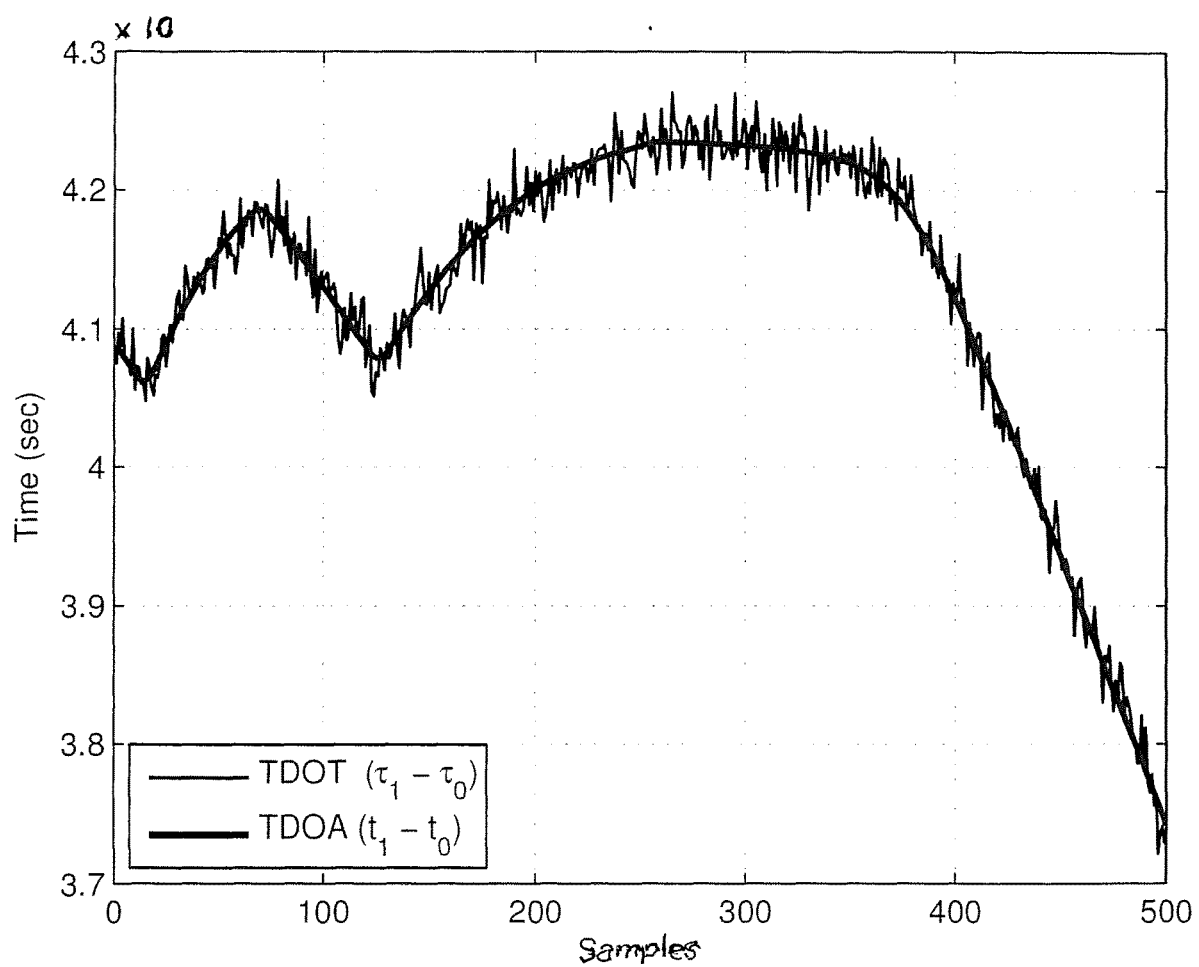
FIG. 11 is a graph showing TDOA versus TDOT.

We conducted several experiments to verify the validity of using TDOT for determining locations of ADS-B transmitters and detecting malicious messages. First, we measured the TDOT versus the TDOA, in FIG. 11 for about 500 samples based on a Monte Carlo simulation of a known aircraft trajectory taking off from Brasilia airport in Brazil. These samples have a clock drift characterized by a standard deviation of 1$\mu$s. Our findings show a negligible difference between the two, which suggests that our approach of using TDOT is valid.

Figure 12:
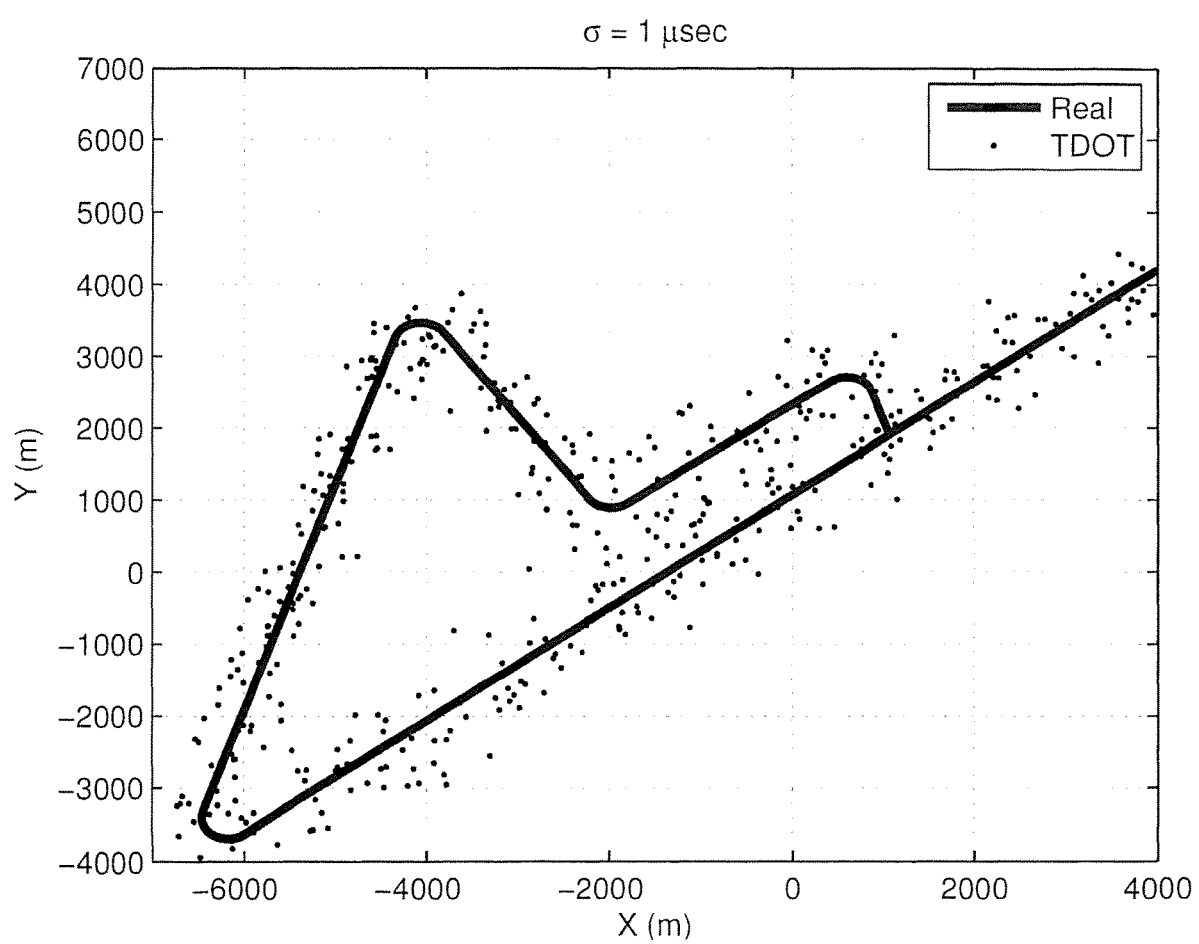
FIG. 12 is a graph showing location estimation using TDOT.
Figure 13:
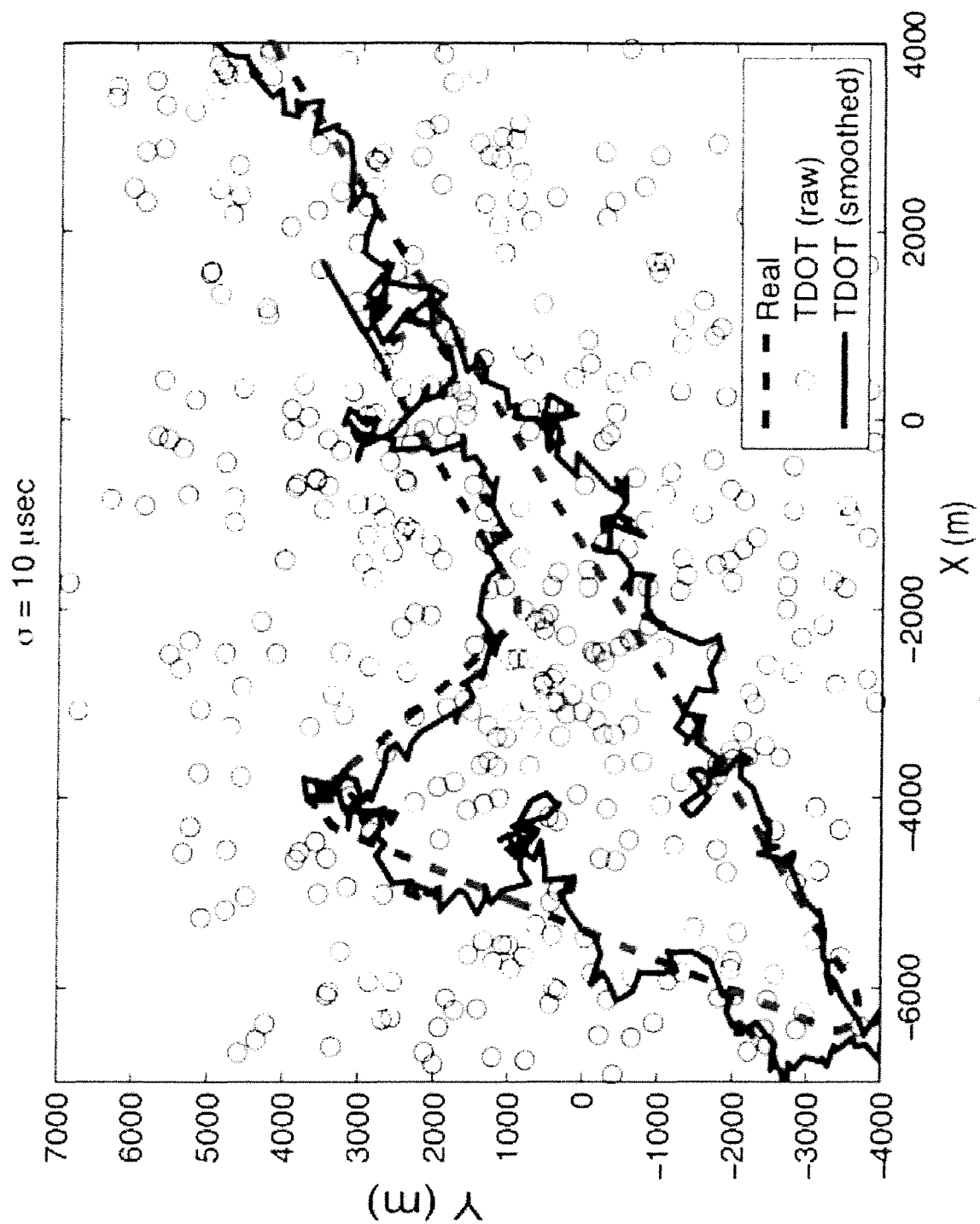
FIG. 13 is a graph showing location estimation with Kalman filtering.

Second, we estimated the location based on the TDOT. The results depicted in FIG. 12 are encouraging, as the locations obtained were close enough to the real trajectory for a time variance at the sensor of 1 µs. However, a high time variance at the sensor could affect the location estimation considerably, as shown in FIG. 13 where the variance is 10$ \mu$s and thus negatively affects the precision of the location estimation. Consequently, we use Kalman filtering to improve the result.

Figure 14:
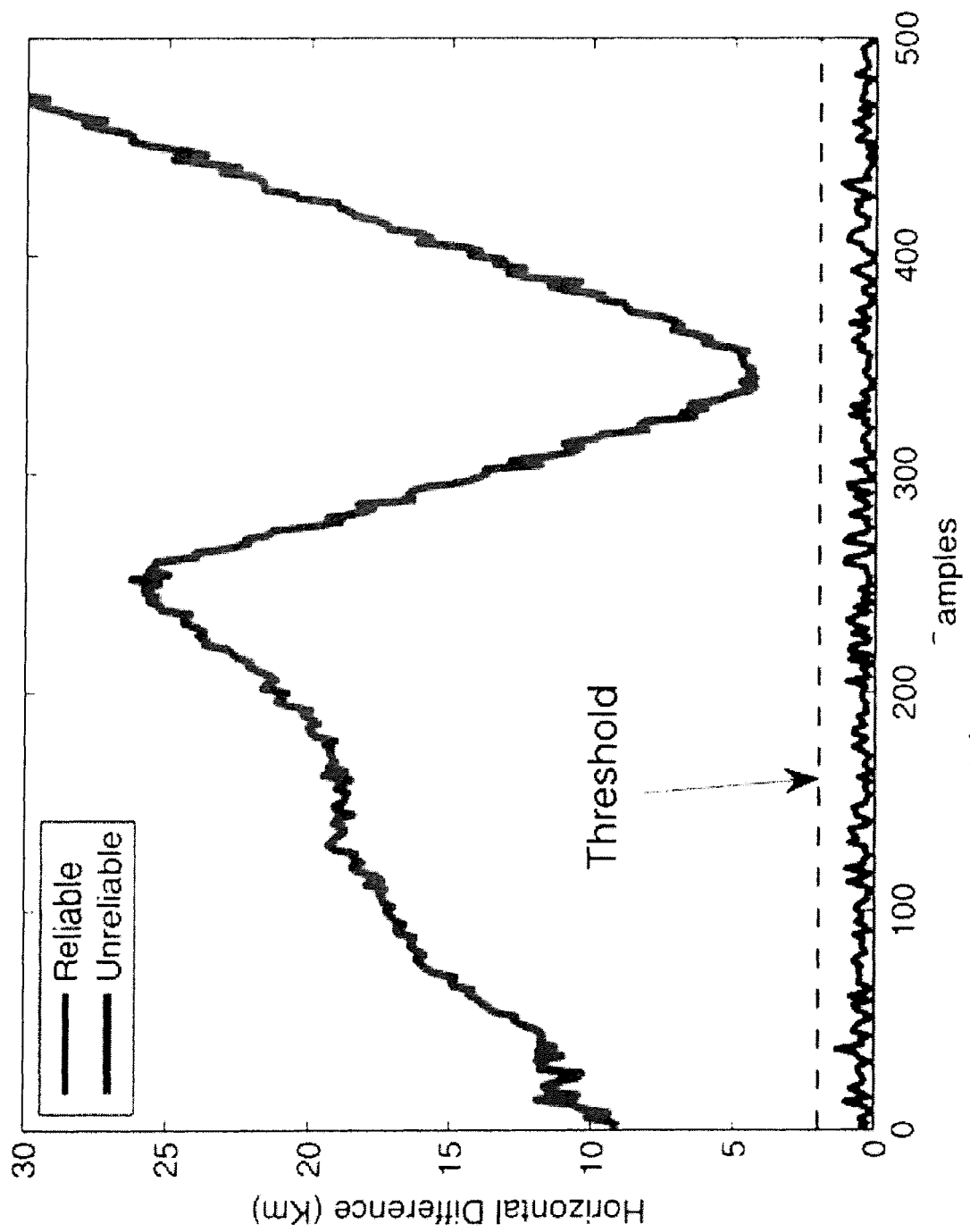
FIG. 14 is a graph showing detection of malicious ADS-B messages.

Algorithm 3 ascertains the validity of ADS-B messages using the radio location component. FIG. 14 shows the outcome of that experiment, where the horizontal distance between the reported and estimated positions were computed. The red line represents a horizontal distance higher than the established threshold, which corresponds to malicious messages that are then flagged as malicious messages, while the blue line means lower than the threshold, corresponding to valid messages.

CONCLUSION

The ADS-Bsec according to the invention is a framework that successfully addresses the security problems of ADS-B from a holistic approach, without altering the current packet format or requiring new equipment. The invention achieves this by combining cryptographic, radio-location, and risk-adaptive techniques that would not be effective when used alone. The Secure ADS-B Sender substitutes the CRC field in the original ADS-B message format with a security metadata that is based on keyed-Hash Message Authentication Code (HMAC). This change is software-based, which means that current infrastructure will still be used with no modifications required. The HMAC-based security metadata relies on proper key exchange mechanisms that take into consideration the nature of the airspace and also foreseen vs unforeseen scenarios. The HMAC algorithm is run based on the payload of the two ADS-B messages required to encode a geo-location. The Secure ADS-B receiver compares the received security metadata with the one computed based on the received message payload. Malicious messages for which this check fails are quarantined for further analysis, while a timeout mechanism is triggered to deal with missing messages.

Our holistic approach to ADS-B mixing cryptography, radio location and risk-adaptive techniques can be used to integrate ADS-B in NextGen infrastructure in a secure and affordable fashion. The complexity of the problem requires a wide spectrum of specific solutions, and most research aimed addressing ADS-B security limitations tend to focus on specific aspects and usually fail to provide enough implementation details that could enable a reasonable comparison. Thus, our approach was to evaluate the performance parameters and the validity of our assumptions with field tests and computer simulations, most of it reported in the peer-reviewed publications cited in the references. To the best of our knowledge, at the time of this writing the scientific literature and related research on the subject does not include similar work and results as those presented so far in the ADS-Bsec framework.

Having thus described our invention, what we claim as new and desire to secure by Letters Patent is as follows:

1. A secure Automatic Dependent Surveillance Broadcast (ADS-B) system (ADS-Bsec) comprising one or more senders located on aircraft and at least one receiver located at an Air Traffic Control (ATC) location, the sender comprising:
   inputs from a flight plan and a GPS satellite;
   a security analysis module receiving GPS information;
   an aircraft prediction module which provides input to the security analysis module, the aircraft prediction module receives inputs from the flight plan and an aircraft profile from an aircraft data database (BADA), wherein the aircraft prediction module infers flight trajectory combining flight path information with the BADA profiles; and
   a secure message generator which receives an input from the security analysis module, the secure message generator also receives an input from a key management module and provides an output to a secure ADS-B sender, wherein during flight, the security analysis module cross-checks geographical coordinates from the predicted trajectory against those obtained from satellites to detect GPS spoofing attacks, valid coordinates are then encoded in secure ADS-B messages with a Hash Message Authentication Code (HMAC) key input from the key management module and transmitted by the secure ADS-B sender;
   the receiver comprising:
   a security ADS-B receiver which communicates with the sender;
   the security analysis module and a quarantine database each receiving inputs from the security ADS-B receiver;
   a key management module which provides an input to the security analysis module, wherein messages received by the secure ADS-B receiver are passed to the security analysis module, which obtains the HMAC key from the key management module and verifies the validity of the HMAC-based metadata;
   an aircraft prediction module providing an input to the security analysis module, wherein the aircraft prediction module, in turn, receives inputs from a BADA database and the flight plan, and wherein a predicted position at a time t, obtained from the aircraft prediction module is also computed by the security analysis module when verifying whether the location update inferred from the received ADS-B message is within a normal range, erroneous, or a product of a replayed or fake message, the security analysis module causing fraudulent messages to be quarantined in the quarantine database for further analysis, otherwise, the location update is plotted on a radar display of a visualization module.

2. The secure ADS-B system recited in claim 1, wherein HMAC-based metadata replaces a cyclic redundancy code (CRC) in the ADS-B packet format.

3. The secure ADS-B system recited in claim 2, wherein the packet format is backwards compatible with the ADS-B protocol.

4. The secure ADS-B system recited in claim 2, further comprising one or more receivers installed on respective aircraft so that information is exchanged for both air-to-ground and air-to-air scenarios.

5. The secure ADS-B system recited in claim 2, wherein ADS-Bsec messages are validated in the security analysis module at the receiver either by an aircraft or a ground component by performing the following steps:

retrieving the ADS-B message, an International Civil Aviation Organization (ICAO) identifier, and a sequence number from the ADS-B message;

if ADS-B In is deployed, first retrieving seeds from each key chain for a specific time interval, and next computing a group key;

using Coordinated Universal Time (UTC) to know the seeds to be used in a given time interval;

if ADS-B In is deployed in ground components, getting the key to be used for air-to-ground message validation;

creating and/or retrieving two hash-maps, namely icao_hashmap and the seq_hashmap, the icao_hashmap using the ICAO identifier as key to create the seq_hashmap as mapped content, the hash-map seq_hashmap using the sequence numbers as key, and the mapped content is a queue containing at most two ADS-B messages having the same sequence numbers;

using this double-nested hash-map structure to classify the received messages in buckets;

generating a concatenated string from the payload of the even and odd ADS-B messages located in the same queue;

in case ADS-B In is deployed on an aircraft, generating group-based metadata before checking it against the ones retrieved from received messages;

if a match is found, plotting the corresponding location on the radar display;

otherwise, quarantining corresponding messages;

if the ADS-B In is deployed on a ground component, using the ground-to-air HMAC key to verify the metadata; and triggering a timeout in case one or both ADS-B messages in process of being validated are not received.

6. A method of secure Automatic Dependent Surveillance Broadcast (ADS-bsec) in a system comprising one or more senders located on aircraft and at least one receiver located at an Air Traffic Control (ATC) location, the sender performing the steps of:

receiving inputs from a flight plan and a GPS satellite;

receiving inputs from an aircraft prediction module from the flight plan and an aircraft profile from an aircraft data database (BADA), wherein the aircraft prediction module infers flight trajectory combining flight path information with the BADA profiles the aircraft prediction module providing input to a security analysis module which also receives input from the GPS satellite;

receiving from a secure message generator an input from the security analysis module, the secure message generator also receiving an input from a key management module and providing an output to a secure ADS-B sender;

during flight, cross-checking by the security analysis module geographical coordinates from the predicted trajectory against those obtained from satellites to detect GPS spoofing attacks, encoding valid coordinates in secure ADS-B messages with a hash message authentication code (HMAC) key input from the key management module; and transmitting the secure ADS-B message by the secure ADS-B sender;

the receiver performing the steps of:

communicating with the sender with a security ADS-B receiver for receiving ADS-B messages;

passing messages received by the secure ADS-B receiver to a security analysis module, which obtains the HMAC key from a key management module and verifies the validity of the HMAC-based metadata;

providing an input from an aircraft prediction module to the security analysis module, the aircraft Prediction Module, in turn, receiving inputs from a BADA database and the flight plan;

computing by the security analysis module a predicted position at a time t, obtained from the aircraft prediction module, when verifying whether the location update inferred from the received ADS-B message is within a normal range, erroneous, or a product of a replayed or fake message; and causing by the security analysis module fraudulent messages to be quarantined in a quarantine database for further analysis;

otherwise, causing by the security analysis module the location update to be plotted on a radar display of a visualization module.

7. The method of ADS-Bsec recited in claim 6, wherein the HMAC-based metadata replaces a cyclic redundancy code (CRC) in the ADS-B packet format.

8. A secure Automatic Dependent Surveillance Broadcast (ADS-B) system (ADS-Bsec) comprising one or more senders located on aircraft and at least one receiver located at an Air Traffic Control (ATC) location, the sender comprising:

inputs from a flight plan and a GPS satellite;

a security analysis module receiving GPS information;

an aircraft prediction module which provides input to the security analysis module, the aircraft prediction module receives inputs from the flight plan and an aircraft profile from an aircraft data database (BADA), wherein the aircraft prediction module infers flight trajectory combining flight path information with the BADA profiles;

a secure message generator which receives an input from the security analysis module, the secure message generator also receives an input from a key management module and provides an output to a secure ADS-B sender, wherein during flight, the security analysis module cross-checks geographical coordinates from the predicted trajectory against those obtained from satellites to detect GPS spoofing attacks, valid coordinates are then encoded in secure ADS-B messages with a Hash Message Authentication Code (HMAC) key input from the key management module and transmitted by the secure ADS-B sender;

the receiver comprising:

a security ADS-B receiver which communicates with the sender;

the security analysis module and a quarantine database each receiving inputs from the security ADS-B receiver;

a key management module which provides an input to the security analysis module, wherein messages received by the secure ADS-B receiver are passed to the security analysis module, which obtains the HMAC key from the key management module and verifies the validity of the HMAC-based metadata, wherein the HMAC-based metadata replaces a cyclic redundancy code (CRC) in the ADS-B packet format;

an aircraft prediction module providing an input to the security analysis module, wherein the aircraft prediction module, in turn, receives inputs from a BADA database and the flight plan, and wherein a predicted position at a time t, obtained from the aircraft prediction module is also computed by the security analysis module when verifying whether the location update inferred from the received ADS-B message is within a normal range, erroneous, or a product of a replayed or fake message, the security analysis module causing fraudulent messages to be quarantined in the quarantine database for further analysis, otherwise, the location update is plotted on a radar display of a visualization module, wherein ADS-Bsec messages are validated in the security analysis module at the receiver either by an aircraft or a ground component by performing the following steps:

retrieving the ADS-B message, an International Civil Aviation Organization (ICAO) identifier, and a sequence number from the ADS-B message;

if ADS-B In is deployed, first retrieving seeds from each key chain for a specific time interval, and next computing a group key;

using Coordinated Universal Time (UTC) to know the seeds to be used in a given time interval;

if ADS-B In is deployed in ground components, getting the key to be used for air-to-ground message validation;

creating and/or retrieving two hash-maps, including icao_hashmap and the seq_hashmap, the icao_hashmap using the ICAO identifier as key to create the seq_hashmap as mapped content, the hash-map seq_hashmap using the sequence numbers as key, and the mapped content is a queue containing at most two ADS-B messages having the same sequence numbers;

using this double-nested hash-map structure to classify the received messages in buckets;

generating a concatenated string from the payload of the even and odd ADS-B messages located in the same queue;

in case ADS-B In is deployed on an aircraft, generating group-based metadata before checking it against the ones retrieved from received messages;

if a match is found, plotting the corresponding location on the radar display;

otherwise, quarantining corresponding messages;

if the ADS-B In is deployed on a ground component, using the ground-to-air HMAC key to verify the metadata; and triggering a timeout in case one or both ADS-B messages in process of being validated are not received.

9. The secure ADS-B system recited in claim 8, wherein the packet format is backwards compatible with the ADS-B protocol.

10. The secure ADS-B system recited in claim 8, further comprising one or more receivers installed on respective aircraft so that information is exchanged for both air-to-ground and air-to-air scenarios.

11. The secure ADS-B system recited in claim 8, wherein the HMAC-based metadata is 8 bit-long.

12. The secure ADS-B system recited in claim 8, wherein the ADS-B messages are broadcast using pulse-position modulation.

13. A method of secure Automatic Dependent Surveillance Broadcast (ADS-bsec) in a system comprising one or more senders located on aircraft and at least one receiver located at an Air Traffic Control (ATC) location, the sender performing the steps of;

receiving inputs from a flight plan and a GPS satellite;

receiving inputs from an aircraft prediction module from the flight plan and an aircraft profile from an aircraft data database (BADA), wherein the aircraft prediction module infers flight trajectory combining flight path information with the BADA profiles the aircraft prediction module providing input to a security analysis module which also receives input from the GPS satellite;

receiving from a secure message generator an input from the security analysis module, the secure message generator also receiving an input from a key management module and providing an output to a secure ADS-B sender;

during flight, cross-checking by the security analysis module geographical coordinates from the predicted trajectory against those obtained from satellites to detect GPS spoofing attacks, encoding valid coordinates in secure ADS-B messages with a hash message authentication code (HMAC) key input from the key management module, wherein HMAC-based metadata replaces a cyclic redundancy code (CRC) in the ADS-B packet format; and transmitting the secure ADS-B message by the secure ADS-B sender;

the receiver performing the steps of:

communicating with the sender with a security ADS-B receiver for receiving ADS-B messages;

passing messages received by the secure ADS-B receiver to a security analysis module, which obtains the HMAC key from a key management module and verifies the validity of the HMAC-based metadata;

providing an input from an aircraft prediction module to the security analysis module, the aircraft Prediction Module, in turn, receiving inputs from a BADA database and the flight plan;

computing by the security analysis module a predicted position at a time t, obtained from the aircraft prediction module, when verifying whether the location update inferred from the received ADS-B message is within a normal range, erroneous, or a product of a replayed or fake message;

causing by the security analysis module fraudulent messages to be quarantined in a quarantine database for further analysis, or otherwise, causing by the security analysis module the location update to be plotted on a radar display of a visualization module;

validating ADS-Bsec messages in the security analysis module at the receiver either by an aircraft or a ground component by performing the following steps:

retrieving the ADS-B message, an International Civil Aviation Organization (ICAO) identifier, and a sequence number from the ADS-B message;

if ADS-B In is deployed, first retrieving seeds from each key chain for a specific time interval, and next computing a group key;

using Coordinated Universal Time (UTC) to know the seeds to be used in a given time interval;

if ADS-B In is deployed in ground components, getting the key to be used for air-to-ground message validation;

creating and/or retrieving two hash-maps, namely icao_hashmap and the seq_hashmap, the icao_hashmap using the ICAO identifier as key to create the seq_hashmap as mapped content, the hash-map seq_hashmap using the sequence numbers as key, and the mapped content is a queue containing at most two ADS-B messages having the same sequence numbers;

using this double-nested hash-map structure to classify the received messages in buckets;

generating a concatenated string from the payload of the even and odd ADS-B messages located in the same queue;

in case ADS-B In is deployed on an aircraft, generating group-based metadata before checking it against the ones retrieved from received messages;

if a match is found, plotting the corresponding location on the radar display;

otherwise, quarantining corresponding messages;

if the ADS-B In is deployed on a ground component, using the ground-to-air HMAC key to verify the metadata; and triggering a timeout in case one or both ADS-B messages in process of being validated are not received.

14. The method of ADS-Bsec recited in claim 13, wherein the HMAC-based metadata replaces a cyclic redundancy code (CRC) in the ADS-B packet format.

15. The method of ADS-Bsec recited in claim 13, further comprising:
    installing one or more receivers on respective aircraft; and
    exchanging information for both air-to-ground and air-to-air scenarios.

16. The method of ADS-Bsec recited in claim 13, wherein the HMAC-based metadata is 8 bit-long.

17. The method of ADS-Bsec recited in claim 6, further comprising:
    installing one or more receivers on respective aircraft; and
    exchanging information for both air-to-ground and air-to-air scenarios.

18. The method of ADS-Bsec recited in claim 6, wherein the ADS-B messages are broadcast using pulse-position modulation.

19. The secure ADS-B system recited in claim 1, wherein the HMAC-based metadata is 8 bit-long.

20. The secure ADS-B system recited in claim 1, wherein the ADS-B messages are broadcast using pulse-position modulation.

* * * * *